(12) United States Patent
Zilberman et al.

(10) Patent No.: US 10,952,008 B2
(45) Date of Patent: Mar. 16, 2021

(54) AUDIO COMMUNICATION SYSTEM AND METHOD

(71) Applicant: NOVETO SYSTEMS LTD., Petach Tikva (IL)

(72) Inventors: Silviu Zilberman, Rishon Le-Zion (IL); Tomer Shani, Rishon Lezion (IL); Noam Babayoff, Rishon LeZion (IL)

(73) Assignee: NOVETO SYSTEMS LTD., Petach Tikva (IL)

( * ) Notice: Subject to any disclaimer, the term of this patent is extended or adjusted under 35 U.S.C. 154(b) by 0 days.

(21) Appl. No.: 16/475,939

(22) PCT Filed: Jan. 15, 2017

(86) PCT No.: PCT/IL2017/050045
§ 371 (c)(1),
(2) Date: Jul. 3, 2019

(87) PCT Pub. No.: WO2018/127901
PCT Pub. Date: Jul. 12, 2018

(65) Prior Publication Data
US 2020/0245089 A1    Jul. 30, 2020

(30) Foreign Application Priority Data

Jan. 5, 2017    (WO) .................. PCT/IL2017/050017

(51) Int. Cl.
*H04S 7/00*    (2006.01)
*H04S 3/00*    (2006.01)
(Continued)

(52) U.S. Cl.
CPC ................ *H04S 7/303* (2013.01); *B60Q 9/00* (2013.01); *G06K 9/00214* (2013.01);
(Continued)

(58) Field of Classification Search
CPC ...... H04S 7/303; H04S 3/008; H04S 2400/01; H04S 2400/11; H04S 2400/13;
(Continued)

(56) References Cited

U.S. PATENT DOCUMENTS 6,975,731 B1    12/2005    Cohen et al.
8,767,968 B2 *    7/2014    Flaks ..................... H04S 7/304
                                                            381/17
(Continued)

FOREIGN PATENT DOCUMENTS

CN    102522102 A    6/2012
CN    102576259 A    7/2012
(Continued)

*Primary Examiner* — David L Ton
(74) *Attorney, Agent, or Firm* — Browdy and Neimark, PLLC

(57) ABSTRACT

Systems and methods for audio communication are disclosed. The system includes a plurality of transducer units and plurality of three dimensional sensor modules (TDSMs) adapted to be located in a plurality of sites/spaces to which service should be provided by the system. The plurality of transducer units are capable of emitting/directing and focusing ultra-sonic signals to respective coverage zones in the sites, such that localized (confined) sound field can be formed at selected spatial position in the coverage zones by utilizing sound from ultrasound technique. The TDSMs are associated with respective sensing volumes in the sites and are operable to obtain sensory data indicative of the 3D arrangement of elements in a within the sites. The system includes: (i) user detection module for processing the sensory data from the TDSMs to determine spatial location of a user within the sensing volumes; (ii) a mapping module providing spatial mapping between the sensing volumes and the coverage zones; and (iii) output sound generator adapted to utilize the spatial mapping to selecting a transducer unit
(Continued)

for serving the user, and operating the selected transducer to produce the localized sound field in close vicinity to the user's head/ear(s).

20 Claims, 13 Drawing Sheets

(51) Int. Cl.
| | |
|---|---|
| H04R 5/02 | (2006.01) |
| G06K 9/20 | (2006.01) |
| G06K 9/00 | (2006.01) |
| B60Q 9/00 | (2006.01) |
| G10K 11/34 | (2006.01) |
| G01B 11/25 | (2006.01) |
| G01S 17/89 | (2020.01) |

(52) U.S. Cl.
CPC .......... *G06K 9/00255* (2013.01); *G10K 11/34* (2013.01); *H04R 5/02* (2013.01); *H04S 3/008* (2013.01); *G01B 11/25* (2013.01); *G01S 17/89* (2013.01); *G06K 9/2018* (2013.01); *H04R 2499/13* (2013.01); *H04S 2400/01* (2013.01); *H04S 2400/11* (2013.01); *H04S 2400/13* (2013.01); *H04S 2420/01* (2013.01)

(58) Field of Classification Search
CPC ... H04S 2410/01; H04R 5/02; H04R 2499/13; G06K 9/2018; G06K 9/00214; G06K 9/00255

See application file for complete search history.

(56) References Cited

U.S. PATENT DOCUMENTS

| | | | |
|---|---|---|---|
| 9,544,679 B2 | 1/2017 | Trestain et al. | |
| 9,591,427 B1* | 3/2017 | Lyren .................... | G06F 3/011 |
| 9,924,290 B2 | 3/2018 | Babayoff | |
| 9,949,032 B1 | 4/2018 | Johnson | |
| 10,694,313 B2 | 6/2020 | Zilberman | |
| 2003/0185404 A1 | 10/2003 | Milsap | |
| 2004/0247140 A1 | 12/2004 | Norris et al. | |
| 2007/0211574 A1 | 9/2007 | Croft, III | |
| 2012/0051556 A1 | 3/2012 | Pompei | |
| 2012/0093481 A1 | 4/2012 | McDowell et al. | |
| 2012/0120218 A1 | 5/2012 | Flaks | |
| 2013/0033422 A1 | 2/2013 | Choi et al. | |
| 2013/0154919 A1 | 6/2013 | Tan et al. | |
| 2013/0272536 A1 | 10/2013 | Tzirkel-Hancock et al. | |
| 2014/0006017 A1 | 1/2014 | Sen | |
| 2014/0098971 A1 | 4/2014 | Kadar | |
| 2014/0136981 A1 | 5/2014 | Xiang | |
| 2014/0307898 A1 | 10/2014 | Norris | |
| 2015/0036847 A1 | 2/2015 | Donaldson | |
| 2015/0036848 A1 | 2/2015 | Donaldson | |
| 2015/0078595 A1* | 3/2015 | Shintani .................. | H04S 7/303 381/303 |
| 2015/0104037 A1 | 4/2015 | Lee et al. | |
| 2015/0139439 A1 | 5/2015 | Norris | |
| 2015/0208166 A1 | 7/2015 | Raghuvanshi et al. | |
| 2015/0256954 A1 | 9/2015 | Carlsson et al. | |
| 2015/0264509 A1 | 9/2015 | Oishi et al. | |
| 2015/0373477 A1* | 12/2015 | Norris ............... | H04M 1/72572 381/303 |
| 2015/0382129 A1 | 12/2015 | Florencio et al. | |
| 2016/0165337 A1* | 6/2016 | Trestain .................. | H04S 7/303 381/387 |
| 2019/0191241 A1 | 6/2019 | Maeno | |
| 2019/0349703 A1* | 11/2019 | Zilberman .............. | H04S 3/008 |
| 2020/0245089 A1* | 7/2020 | Zilberman .............. | H04S 7/303 |

FOREIGN PATENT DOCUMENTS

| | | |
|---|---|---|
| CN | 103034328 A | 4/2013 |
| CN | 103049090 A | 4/2013 |
| CN | 104937660 A | 9/2015 |
| CN | 105007553 A | 10/2015 |
| CN | 105681968 A | 6/2016 |
| CN | 103187080 A | 1/2017 |
| DE | 10 2007 032272 A1 | 1/2009 |
| JP | 2003092799 A | 3/2003 |
| JP | 2007266919 A | 10/2007 |
| WO | 2006005938 A1 | 1/2006 |
| WO | 2011056731 A | 5/2011 |
| WO | 2014076707 A2 | 5/2014 |
| WO | 2014147625 A1 | 9/2014 |
| WO | 2015061347 A1 | 4/2015 |
| WO | 2015108824 A1 | 7/2015 |
| WO | 2016048381 A1 | 3/2016 |
| WO | 2016/182678 A1 | 11/2016 |

* cited by examiner

AUDIO COMMUNICATION SYSTEM AND METHOD

TECHNOLOGICAL FIELD

The present invention is in the field of Human-Machine Interface, utilizing audio communication and is relevant to systems and method for providing hands-free audio communication.

BACKGROUND

Audio communication takes a large portion of human interaction. We conduct telephone conversations, listen to music or sound associated with TV shows and receive alert such as alarm clock or finish of a microwave oven or dishwasher cycle.

The natural wave behavior of acoustic signals and the relatively long wavelength results with large spreading of the sound waves and allows people located in a common region to hear the sound and perceive the data carried thereon.

Various techniques are known for allowing a user to communication via sound while maintaining privacy of the communication. Between such techniques, best known examples include the telephone receiver and headphones or earphones, all providing relatively low amplitude acoustic signals directed at one or both of the user's ears.

Additional techniques developed by the inventors of the present application provide private sound transmitted to a selected user from a remote location. The details of this technique are described in WO 2014/076707 and in WO 2014/147625 both assigned to the assignee of the present application.

More specifically, WO 2014/076707 discloses a system and method for generating a localized audible sound field at a designated spatial location. According to this technique, spatially confined audible sound carrying predetermined sound-data is produced locally at a designated spatial location at which it should be heard. Even more specifically, according to the disclosed technique in order to generate the locally confined audible sound carrying the desired sound-data, frequency content of at least two ultrasound beams are determined based on the sound data and the of at least two ultrasound beams are transmitted by an acoustic transducer system (e.g. transducer system including an arrangement of a plurality of ultrasound transducer elements) Then, the spatially confined audible sound is produced at the designated location by the at least two ultrasound beams. For example, the at least two ultrasound beams include at least one primary audio modulated ultrasound beam, whose frequency contents includes at least two ultrasonic frequency components selected to produce the audible sound after undergoing non-linear interaction in a non linear medium, and one or more additional ultrasound beams each including one or more ultrasonic frequency components. Location-data indicative of the designated location is utilized for determining at least two focal points for the at least two ultrasound beams respectively such that focusing the at least two ultrasound beams on the at least two focal points enables generation of a localized sound field with the audible sound in the vicinity of the designated spatial location.

WO 2014/147625, which is also assigned to the assignee of the present application, describes a transducer system including a panel having one or more piezo-electric enabled foils/sheets/layers and an arrangement of electric contacts coupled to the panel. The electric contacts are configured to define a plurality of transducers in the panel. Each transducer is associated with a respective region of the panel and with at least two electric contacts that are coupled to at least two zones at that respective region of the panel. The electric contacts are adapted to provide electric field in these at least two zones to cause different degrees of piezo-electric material deformation in these at least two zones and to thereby deform the respective region of the panel in a direction substantially perpendicular to a surface of the panel, and to thereby enable efficient conversion of electrical signals to mechanical vibrations (acoustic waves) and/or vice versa. The transducer of this invention may be configured and operable for producing at least two ultrasound beams usable for generating the spatially confined audible sound disclosed in WO 2014/076707 discussed above.

GENERAL DESCRIPTION

There is a need in the art for a novel system and method capable of managing private sound (i.e. providing sound to a selected user to be privately consumed/heard by the user) directed to selected one or more users located within certain space. The technique of the present invention utilizes one or more Three Dimensional Sensor Modules (TDSM) associated with one or more transducer units for determining location of a user and determining an appropriate sound trajectory for transmission private sound signals to the selected user, while eliminating, or at least significantly reducing interference of the sound signal with other users, which may be located in the same space.

In this connection it should be noted that the Three Dimensional Sensor Modules may or may not be configured for providing three dimensional sensing data when operating as a single module. More specifically, the technique of the present invention utilizes one or more sensor modules arranged in a region of interest and analyzes and processes sensing data received therefore to determine three dimensional data. To this end the TDSM units may include camera units (e.g. array/arrangement of several camera units) optionally associated/including diffused infra-red (IR) emitter, and additionally or alternatively may include other type(s) of sensing module(s) operable sensing three dimensional data indicative of a three dimensional arrangement/ content of a sensing volume.

The technique of the present invention utilizes one or more transducer units (transducer arrays) suitable to be arranged in a space (e.g. apartment, house, office building, public spaces, vehicles interior, etc. and mounted on walls, ceilings or standing on shelves or other surfaces) and configured and operable for providing private (e.g. locally confined) audible sound (e.g. vocal communication) to one or more selected users.

For example, in some implementations of the present invention, one or more transducer units such as the transducer unit disclosed in WO 2014/147625, which is assigned to the assignee of the present application, are included/ associated with the system of the present invention and are configured to generate directed, and generally focused, acoustic signals to thereby create audible sound at a selected point (confined region) in space within a selected distance from the transducer unit.

To this end, in some embodiments of the present invention the one or more transducer units are configured to selectively transmit acoustic signals at two or more ultra-sonic frequency ranges such that the ultra-sonic signals demodulate to form audible signal frequencies at a selected location. The emitted ultra-sonic signals are focused to the desired location where the interaction between the acoustic waves causes self-demodulation generating acoustic waves at audible frequencies. The recipient/target location and generated audible signal are determined in accordance with selected amplitudes, beam shape and frequencies of the output ultra-sonic signals as described in patent publication WO 2014/076707 assigned to the assigned of the present application and incorporated herein by reference in connection to the technique for generating private sound region.

The present technique utilizes such one or more transducer units in combination with one or more Three Dimensional Sensor Modules (TDSMs) and one or more microphones units, all connectable to one or more processing unit to provide additional management functionalities forming a hand-free audio communication system. More specifically, the technique of the invention is based on generating a three dimensional model of a selected space, and enable one or more users located in said space to initiate and respond to audio communication sessions privately and without the need to actively be in touch with a control panel or hand held device.

In this connection the present invention may provide various types of communication sessions including, but not limited to: local and/or remote communication with one or more other users, receiving notification from external systems/devices, providing vocal instructions/commands to one or more external devices, providing internal operational command to the system (e.g. privilege management, volume changes, adding user identity etc.), providing information and advertising from local or remote system (e.g. public space information directed to specific users for advertising, information about museum pieces, in ear translation etc.). The technique of the invention may also provide indication about user's reception of the transmitted data as described herein below. Such data may be further process to determine effectiveness of advertising, parental control etc.

To this end the present technique may be realized using centralized or decentralized (e.g. distributed) processing unit(s) (also referred herein as control unit or audio server system) connectable to one or more transducer units and one or more TDSMs and one or more microphone units or in the form of distributed management providing one or more audio communication system, each comprising a transducer unit, a TDSM unit, a microphone unit and certain processing capabilities, where different audio communication systems are configured to communicate between them to thereby provide audio communication to region greater than coverage area of a single transducer unit, or in disconnected regions (e.g. different rooms separated by walls).

The processor, being configured for centralized or distributed management, is configured to receive data (e.g. sensing data) about the three dimensional configuration of the space in which the one or more TDSM are located. Based on at least initial received sensing data, the processor may be configured and operable to generate a three dimensional (3D) model of the space. The 3D model generally includes data about arrangement of stationary objects within the space to thereby determine one or more coverage zones associates with the one or more transducer units. Thus, when one or more of the TDSMs provides data indicative of user being located in certain location in the space, a communication session (remotely initiated or by the user) is conducted privately using a transducer unit selected to provide optimal coverage to the user's location.

Alternatively or additionally, the technique may utilize image processing techniques for locating and identifying user existence and location within the region of interest based on input data from the one or more TDSM unit and data about relative arrangement of coverage zones of the transducer array units and sensing volumes of the TDSM units. It should be understood that generally an initial calibration may be performed to the system. Such initial calibration typically comprises providing data about number, mounting locations and respective coverage zones of the different transducer array units, TDSM units and microphone units, as well as any other connected elements such as speakers when used. Such calibration may be done automatically in the form of generating of 3D model as described above, or manually by providing data about arrangement of the region of interest and mounting location of the transducer array units, TDSM units and microphone units.

It should be noted that the one or more TDSMs may comprise one or more camera units, three dimensional camera units or any other suitable imaging system. Additionally, the one or more transducer units may also be configured to periodic scanning of the coverage zone with an ultra-sonic beam and determine mapping of the coverage region based on detected reflection. Thus, the one or more transducer units may be operated as sonar to provide additional mapping data. Such sonar based mapping data may include data about reflective properties of surfaces as well as the spatial arrangement thereof.

Additionally, the one or more microphone units may be configured as microphone array units and operable for providing input acoustic audible data collected from a respective collection region (e.g. sensing volume). The one or more microphone units may include an array of microphone elements enabling collection of audible data and providing data indicative of direction from which collected acoustic signals have been originated. The collected acoustic directional data may be determined based on phase or time variations between signal portions collected by different microphone elements of the array. Alternatively, the microphone unit may comprise one or more directional microphone elements configured for collecting acoustic signals from different directions within the sensing zone. In this configuration, direction to the origin of a detected signal can be determined based on variation in collected amplitudes as well as time delay and/or phase variations.

Generally, an audio communication session may be unilateral or bilateral. More specifically, a unilateral communication session may include an audible notification sent to a user such as notification about new email, notification that a washing machine finished a cycle etc. A bilateral audio communication session of the user generally includes an audio conversation during which audible data is both transmitted to the user and received from the user. Such communication sessions may include a telephone conversation with a third part, user initiated commands requesting the system to perform one or more tasks etc.

Additionally, the system may be employed in a plurality of disconnected remote regions of interest providing private communication between two or more remote spaces. To this end, as described herein below the region of interest may include one or more connected space and additional one or more disconnected/remote location enabling private and hand free communication between users regardless of physical distance between them, other than relating to possible time delay associated with transmission of data between the remote locations.

The technique of the present invention may also provide indication associated with unilateral communication session and about success thereof. More specifically, the present technique utilize sensory data received from one or more of the TDSMs indicating movement and/or reaction of the user at time period of receiving input notification and determine to certain probability if the user actually noticed the notification or not. Such response may be associated with facial of body movement, voice or any other response that may be detected using the input devices associated with the system.

As indicated above, the 3D model of the space where the system is used may include one or more non-overlapping or partially overlapping coverage regions associated with one or more transducer units. Further, the present technique allows for a user to maintain a communication session while moving about between regions. To this end, the system is configured to receive sensing data from the one or more TDSMs and for processing the sensing data to provide periodic indication about the location of one or more selected users, e.g. a user currently engaged in communication session.

Further, to provide private sound the one or more transducer unit are preferably configured and operated to generate audible sound within a relatively small focus point. This forms a relatively small region where the generated acoustic waves are audible, i.e. audible frequency and sufficient sound pressure level (SPL). The bright zone, or audible region, may for example be of about 30 cm radius, while outside of this zone the acoustic signals are typically sufficiently low to prevent comprehensive hearing by others. Therefore, the audio communication system may be also configured for processing input sensing data to locate a selected user and identify location and orientation of the user's head and ears to determine location for generating audible (private) sound region. Based on the 3D model of the space where the system is employed, the processing may include determining a line of sight between a selected transducer unit and at least one of the user's ears. In case no direct line of sight is determined, a different transducer unit may be used. Alternatively, the 3D model of the space may be used to determine a line of sight utilizing sound reflection from one or more reflecting surfaces such as walls. When the one or more transducer units are used as sonar-like mapping device, data about acoustic reflection of the surfaces may be used to determine optimal indirect line of sight. Additionally, to provide effective acoustic performance, the present technique may utilize amplitude adjustment when transmitting acoustic signals along an indirect line of sight to a user.

In this regards, it should be also be noted that in cases/embodiments where the system is configured to engage with both ears of a user separately, amplitude adjustment and balancing is also carried out for balancing the volume between the two ears (specifically in cases where the ears are at different distances to the transducer units serving them).

In this connection, the above described technique and system enables providing audio communication within a region of interest (ROI), by employing a plurality of transducer array units and corresponding TDSM units and microphone units. The technique enables audio private communication to one or more users, for communicating between them or with external links, such that only a recipient user of certain signal receives an audible and comprehensible acoustic signal, while other users, e.g. located at distance as low as 50 cm from the recipient, will not be able to comprehensively receive the signal.

Also, the technique of the present invention provides for determining location of a recipient for direct and accurate transmission of the focused acoustic signal thereto. The technique also provides for periodically locating selected users, e.g. user marked as in ongoing communication session, to thereby allow the system to track the user and maintain the communication session even when the users moves in space. To this end the technique provides for continuously selecting preferred transducer array units for signal transmission to the user in accordance with user location and orientation. The system and technique thereby enable a user to move between different partially connected spaces within the ROI (e.g. rooms) while maintaining an ongoing communication session.

Thus, according to one broad aspect of the present invention, there is provided a system for use in audio communication. The system includes:

one or more (e.g. a plurality of) transducer units to be located in a plurality of sites for covering respective coverage zones in said sites. The sites may be different spaces and/or regions of interest (ROIs) to which audio services should be provided by the system. The at transducer units (e.g. at least some of them) are capable of emitting ultra-sonic signals in one or more general frequencies for forming local audible sound field at selected spatial position within their respective coverage zones; the transducer unit may include an array of transducer elements.

one or more (e.g. a plurality of) a three dimensional sensor modules (TDSMs; also referred to herein as three dimensional input device, e.g. 3D camera, radar, sonar, light detection and ranging (LIDAR)) configured to provide data about three dimensional arrangement of the surrounding within a field of view of the input device. The TDSMs are adapted to be located in the sites (spaces) to be covered by the system, and each three dimensional sensor module is configured and operable to provide sensory data about three dimensional arrangement of elements in a respective sensing volume within the sites.

a mapping module providing map data indicative of a relation between the sensing volumes and the coverage zones of said TDSMs and transducer units respectively.

a user detection module connectable to said one or more three dimensional sensor modules for receiving said sensory data therefrom, and configured and operable to process said sensory data to determine spatial location of at least one user within the sensing volumes of the TDSMs. and an output sound generator (also referred to herein as sound processing utility) connectable to said one or more transducer units and adapted to receive sound data indicative of sound to be transmitted to said at least one user, and configured and operable for operating at least one selected transducer unit for generating localized sound field carrying said sound data in close vicinity to said at least one user, wherein said output sound generator utilizes the map data to determine said at least one selected transducer unit in accordance with said data about spatial location of the at least one user such that the respective coverage zone of said selected transducer unit includes said location of said at least one user.

In some embodiments the system includes an audio session manager (e.g. including input and output communication utilities) which is configured to enable communication with remote parties via one or more communication networks; and at least one sound processing utility. The at least one processor utility comprises: region of interest (ROI) mapping module configured and operable to receive three-dimensional input of the field of view from the 3D input device and generate a 3D model of the ROI; user detection module configured and operable to receive three-dimensional input of the field of view from the 3D input device and determine existence and location of one or more people within the region of interest. The processor unit is configured for generating voice data and for operating the at least one transducer unit to transmitting suitable signal for generating a local sound field at close vicinity to a selected user's ear thereby enabling private communication with the user.

The system may further comprise a received sound analyzer connectable to one or more microphone units configured for receiving audio input from the ROI, and adapted to determine data indicative of location of origin of said audio signal within the ROI.

Additionally, or alternatively, the system may comprise, or be connectable to one or more speakers for providing audio output that may be heard publicly by a plurality of users. Further, the system may also comprise one or more display units configured and operable for providing display of one or more images or video to users.

It should be noted that the system may utilize data about user location for selection of one or more transducer units to provide local private audio data to the user. Similarly, when speakers and/or display units are used, the system may utilize data about location of one or more selected users to determine one or more selected speaker and/or display units for providing corresponding data to the users.

According to some embodiments the processing unit may further comprise a gesture detection module configured and operable to receive input audio signals and location thereof from the audio-input location module and to determine if said input audio signal includes one or more keywords requesting initiation of a process or communication session.

The processing unit may further comprise an orientation detection module. The orientation detection module may be configured and operable for receiving data about said 3D model of the region of interest and data about location of at least one user, and for determining orientation of the at least one user's ears with respect to the system thereby generating an indication whether at least one of the at least one user's ears being within line of sight with the at least one transducer unit.

According to some embodiments, the processor unit may further comprise a transducer selector module configured and operable for receiving data indicating whether at least one of the at least one user's head or ears being within line of sight with the at least one transducer unit and for determining optimized trajectory for sound transmission to the user's ears. The optimized trajectory may utilize at least one of: directing the local sound region at a point being within line of sight of the at least one transducer unit while being within a predetermined range from the hidden user's ear; and receiving and processing data about 3D model of the region of interest to determine a sound trajectory comprising one or more reflection from one or more walls within the region of interest towards the hidden user's ear.

According to some embodiments, the processing unit may be configured and operable for communicating with one or more communication systems arranged to form a continuous field of view to thereby provide continuous audio communication with a user while allowing the user to move within a predetermined space being larger than a field of view of the system. Further, the communication system may be employed within one or more disconnected regions providing seamless audio communication with one or more remote locations.

According to some embodiments, the processing unit may be configured and operable for providing one or more of the following communication schemes:
  managing and conducting a remote audio conversation, the processing unit is configured and operable for communication with a remote audio source through the communication network to thereby enable bilateral communication (e.g. telephone conversation);
  providing vocal indication in response to one or more input alerts received from one or more associates systems through said communication network;
  responding to one or more vocal commands from a user generate corresponding commands and transmit said corresponding commands to selected one or more associates systems through the communication network, thereby enabling vocal control for performing one or more tasks by one or more associated systems.

According to yet some embodiments, the processing unit may further comprise a gesture detection module configured and operable for receiving data about user location from the user detection module and identify whether one or more predetermined gestures are performed by the user, upon detecting said one or more predetermined gestures, the gesture detection module generates and transmits a corresponding command to the processing unit for performing one or more corresponding actions.

The system may also comprise a face recognition module configured and operable for receiving input data from the a three dimensional input device and for locating and identifying one or more users within the ROI, the system also comprises a permission selector module, the permission selector module comprises a database of identified users and list of actions said users have permission to use, the permission selector module received data about user's identity and data about a requested action by said user, and provides the processing unit data indicative to whether said user has permission for performing said requested action.

According to one other broad aspect of the present invention, there is provided a system for use in audio communication. The system comprising: one or more transducer units to be located in a plurality of physical locations for covering respective coverage zones, wherein said transducer units are capable of emitting ultra-sonic signals in one or more frequencies for forming local audible sound field at selected spatial position within its respective coverage zone; one or more Three Dimensional Sensor Modules (TDSM) (e.g. 3D camera, radar, sonar, LIDAR) to be located in said sites, wherein each three dimensional sensor module is configured and operable to provide sensory data about three dimensional arrangement of elements in a respective sensing volume within said sites; a mapping module providing map data indicative of a relation between the sensing volumes and the coverage zones; a user detection module connectable to said one or more three dimensional sensor modules for receiving said sensory data therefrom, and configured and operable to process said sensory data to determine spatial location of at least one user's ear within the sensing volumes of the three dimensional sensor modules; and a sound processor utility connectable to said one or more transducer units and adapted to receive sound data indicative of sound to be transmitted to said at least one user's ear, and configured and operable for operating at least one selected transducer unit for generating localized sound field carrying said sound data in close vicinity to said at least one user's ear, wherein said output sound generator utilizes the map data to determine said at least one selected transducer unit in accordance with said data about spatial location of the at least one user's ear received from the corresponding user detection module such that the respective coverage zone of said selected transducer unit includes said location of said at least one user's ear.

The one or more transducer units are preferably capable of emitting ultra-sonic signals in one or more frequencies for forming local focused demodulated audible sound field at selected spatial position within its respective coverage zone.

The system may generally comprise a received sound analyzer configured to process input audio signals received from said sites. Additionally, the system may comprise an audio-input location module adapted for processing said input audio signals to determine data indicative of location of origin of said audio signal within said sites. The received sound analyzer may be connectable to one or more microphone units operable for receiving audio input from the sites.

According to some embodiments the system may comprise, or be connectable to one or more speakers and/or one or more display units for providing public audio data and/or display data to users. Generally, the system may utilize data about location of one or more users for selecting speakers and/or display units suitable for providing desired output data in accordance with user location.

According to some embodiments, the user detection module may further comprise a gesture detection module configured and operable to process input data comprising at least one of input data from said one or more TDSM and said input audio signal, to determine if said input data includes one or more triggers associated with one or more operations of the system, said sound processor utility being configured determine location of origin of the input data as initial location of the user to be associated with said operation of the system. Said one or more commands may comprise a request for initiation of an audio communication session. The input data may comprise at least one of audio input data received by the received sound analyzer and movement pattern input data received by the TDSM. More specifically, the gesture detection module may be configured for detecting vocal and/or movement gestures.

According to some embodiments, the user detection module may comprise an orientation detection module adapted to process said sensory data to determine a head location and orientation of said user, and thereby estimating said location of the at least one user's ear.

According to some embodiments, the user detection module includes a face recognition module adapted to process the sensory data to determine location of at least one ear of the user. The output sound generator is configured and operable for determining an acoustic field propagation path from at least one selected transducer unit for generating the localized sound field for the user such that the localized sound field includes a confined sound bubble in close vicinity to the at least one ear of the user.

For example, the face recognition module may be configured and operable to determine said location of the at least one ear of the user based on an anthropometric model of the user's head. In some cases, the face recognition module is configured and operable to at least one of constructing and updating said anthropometric model of the user's head based on said sensory data received from the TDSM.

In some embodiments, the face recognition module is adapted to process the sensory data to determine locations of two ears of the user, and wherein said output sound generator is configured and operable for determining two acoustic field propagation paths from said at least one selected transducer unit towards said two ears of the user respectively, and generating said localized sound field such that it includes two confined sound bubbles located in close vicinity to said two ears of the user respectively, thereby providing private binaural (e.g. stereophonic) audible sound to said user.

In some embodiments, the output sound generator is configured and operable for determining respective relative attenuations of acoustic field propagation along the two propagation paths to the two ears of the user, and equalizing volumes of the respective acoustic fields directed to the two ears of the user based on said relative attenuations, to thereby provide balanced binaural audible sound to said user.

According to some embodiments the user detection module is further configured and operable to process the received sensory data and to differentiate between identities of one or more users in accordance with the received sensory data, the user detection module thereby provides data indicative of spatial location and identity of one or more users within the one or more sensing volumes of the three dimensional sensor modules.

The system may also comprise a face recognition module. The face recognition module is typically adapted for receiving data about the user location from the user detection module, and for receiving at least a portion of the sensory data associated with said user location from the TDSMs, and is configured and operable for applying face recognition to determine data indicative of an identity of said user. In some configurations, the system may further comprise a privileges module. The privileges module may comprise or utilize a database of identified users and list of actions said users have permission to use. Generally, the privileges module receives said data indicative of the user's identity from said face recognition module and data about a requested action by said user, and provides the processing unit data indicative to whether said user has permission for performing said requested action.

According to some embodiments, the sound processor utility may be adapted to apply line of sight processing to said map data to determine acoustical trajectories between said transducer units respectively and said location of the user's ear, and process the acoustical trajectories to determine at least one transducer unit having an optimal trajectory for sound transmission to the user's ear, and set said at least one transducer unit as the selected transducer unit. Such optimized trajectory may be determined such that it satisfies at least one of the following: it passes along a clear line of sight between said selected transducer unit and the user's ear while not exceeding a certain first predetermined distance from the user's ear; it passes along a first line of sight from said transducer unit and an acoustic reflective element in said sites and from said acoustic reflective element to said user's ear while not exceeding a second predetermined distance.

According to some embodiments, sound processor utility utilizes two or more transducer units to achieve an optimized trajectory, such that at least one transducer unit has a clear line of sight to one of the user's ears and the least one other transducer unit has a clear line of sight to the second user's ear.

According to some embodiments, the sound processor utility may be adapted to apply said line of site processing to said map data to determine at least one transducer unit for which exist a clear line of site to said location of the user's ear within the coverage zone of the at least one transducer unit, and set said at least one transducer unit as the selected transducer unit and setting said trajectory along said line of site.

In case the lines of site between said transducer units and said location of the user's ear are not clear, said line of site processing may include processing the sensory data to identify an acoustic reflecting element in the vicinity of said user's; determining said selected transducer unit such that said trajectory from the selected transducer unit passes along a line of site from the selected transducer unit and said acoustic reflecting element, and therefrom along a line of site to the user's ear.

The output sound generator is configured and operable to monitor location of the user's ear to track changes in said location, and wherein upon detecting a change in said location, carrying out said line of site processing to update said selected transducer unit, to thereby provide continuous audio communication with a user while allowing the user to move within said sites. The sound processor utility may be adapted to process said sensory data to determine a distance along said propagation path between the selected transducer unit and said user's ear and adjust an intensity of said localized sound field generated by the selected transducer unit in accordance with said distance. In case an acoustic reflecting element exists in the trajectory between the selected transducer unit and the user's ear, said processing utility may be adapted to adjust said intensity to compensate for estimated acoustic absorbance properties of said acoustic reflecting element. Further, in case an acoustic reflecting element exists in said propagation path, said processing utility may be adapted to equalized spectral content intensities of said ultrasonic signals in accordance with said estimated acoustic absorbance properties indicative of spectral acoustic absorbance profile of said acoustic reflecting element.

Generally, the sound processor utility may be adapted to process the input sensory data to determine a type (e.g. table, window, wall etc.) of said acoustic reflecting element and estimate said acoustic absorbance properties based on said type.

The sound processor utility may also be configured for determining a type of one or more acoustic reflective surfaces in accordance with data about surface types stored in a corresponding storage utility and accessible to said sound processor utility.

According to some embodiments, the system may comprise a communication system connectable to said output sound generator and configured and operable for operating said output sound generator to provide communication services to said user. The system may be configured and operable to provide one or more of the following communication schemes:
  managing and conducting a remote audio conversation, the communication system is configured and operable for communication with a remote audio source through the communication network to thereby enable bilateral communication (e.g. telephone conversation);
  managing and conducting seamless local private audio communication between two or more users within the region of interest;
  processing input audio data and generating corresponding output audio data to one or more selected users;
  providing vocal indication in response to one or more input alerts received from one or more associates systems through said communication network; and
  responding to one or more vocal commands from a user generate corresponding commands and transmit said corresponding commands to selected one or more associates systems through the communication network, thereby enabling vocal control for performing one or more tasks by one or more associated systems.

The system 1000 may comprises a gesture detection module configured and operable for receiving data about user location from the user detection module, and connectable to said three dimensional sensor modules for receiving therefrom at least a portion of the sensory data associated with said user location; said gesture detection is adapted to apply gesture recognition processing to said at least a portion of the sensory data to identify whether one or more predetermined gestures are performed by the user, upon detecting said one or more predetermined gestures, the gesture detection module generates and transmits a corresponding commands for operating said communication system for performing one or more corresponding actions.

According to some embodiments, the system may further comprise a user response detection module adapted for receiving a triggering signal from said communication system indicative of a transmission of audible content of interest to said user's ear; and wherein said user response detection module is adapted for receiving data about the user location from the user detection module, and for receiving at least a portion of the sensory data associated with said user location from the three dimensional sensor modules, and is configured and operable for processing said at least portion of the sensory data, in response to said triggering signal, to determine response data indicative of a response of said user to said audible content of interest. The response data may be recorded in a storage utility of said communication system or uploaded to a server system.

The system of the claims may be associated with an analytics server configured and operable to receive said response data from the system in association with said content of interest and process said statistically response data provided from a plurality of users in response to said content of interest to determine parameters of user's reactions to said content of interest.

Generally, said content of interest may include commercial advertisements and wherein said communication system is associated with an advertisement server providing said content of interest.

According to one other broad aspect of the present invention, there is provided a vocal network system comprising a server unit and one or more local audio communication systems as described above arranged in a space for covering one or more ROI's in a partially overlapping manner; the server system being connected to the one or more local audio communication systems through a communication network and is configured and operable to be responsive to user generated input messages from any of the local audio communication systems, and to selectively locate a desired user within said one or more ROI's and selectively transmit vocal communication signals to said desired user in response to one or more predetermined conditions.

According to yet one other broad aspect of the invention, there is provided a server system for use in managing personal vocal communication network; the server system comprising: an audio session manager configured for connecting to a communication network and to one or more local audio systems; a mapping module configured and operable for receiving data about 3D models from the one or more local audio systems and generating a combined 3D map of the combined region of interest (ROI) covered by said one or more local audio systems; a user location module configured and operable for receiving data about location of one or more users from the one or more local audio systems and for determining location of a desired user in the combined ROI and corresponding local audio system having suitable line of sight with the user. The server system is configured and operable to be responsive to data indicative of one or more messages to be transmitted to a selected user. In response to such data, the server system receives, from the user location module, data about location of the user and about suitable local audio system for communicating with said user and transmitting data about said one or more messages to the corresponding local audio system for providing vocal indication to the user.

The user location module may be configured to periodically locate the selected user and the corresponding local audio system, and to be responsive to variation in location or orientation of the user to thereby change association with a local audio system to provide seamless and continuous vocal communication with the user.

According to yet another broad aspect of the invention, there is provided a method for use in audio communication, the method comprising: providing data about one or more signals to be transmitted to a selected user, providing sensing data associated with a region of interest, processing said sensing data for determining existence and location of the selected user within the region of interest, selecting one or more suitable transducer units located within the region of interest and operating the selected one or more transducer elements for transmitting acoustic signals to determined location of the user to thereby provide local audible region carrying said one or more signals to said selected user.

According to yet another broad aspect of the invention, there is provided a method comprising: transmitting a predetermined sound signal to a user and collecting sensory data indicative of user response to said predetermined sound signal thereby generating data indicative of said user's reaction to said predetermined sound signal, wherein said transmitting comprising generating ultra-sonic field in two or more predetermined frequency ranges configured to interact at a distance determined in accordance with physical location of said user, to thereby form a local sound field providing said predetermined sound signal.

According to another broad aspect of the present invention, there is provided a system for use in audio communication. The system includes:
  at least one transducer unit adapted for forming local audible sound field at selected spatial position within at least one respective coverage zone of at least one site;
  at least one Three Dimensional Sensor Module (TDSM) configured and operable to provide sensory data about three dimensional arrangement of elements in a respective sensing volume within the at least one site;
  a user detection module connectable to the one or more three dimensional sensor modules for receiving the sensory data therefrom, and configured and operable to process the sensory data to determine spatial location of at least one user within the at least one site;
  a face recognition module adapted to process the sensory data to determine location of at least one ear of the user; and
  an output sound generator connectable to the one or more transducer units and adapted to receive sound data indicative of sound to be transmitted to the at least one user, and configured and operable for determining an acoustic field propagation path from said at least one transducer unit for generating a localized sound field including a confined sound bubble in close vicinity to the at least one ear of the user, and operating the at least one transducer unit for generating the localized sound field.

According to yet another broad aspect of the present invention, there is provided a method for use in audio communication, the method includes: providing data about one or more signals to be transmitted to a selected user; providing sensing data associated with a region of interest; processing the sensing data to determine existence of the selected user within the region of interest, and to determine a location of at least one ear of the user in the region of interest; and selecting and operating one or more suitable transducer units located within the region of interest for transmitting acoustic signals to the determined location of the at least one ear of the user.

In some implementations, the location of the at least one ear of the user is determined based on an anthropometric model of the user's head. In some cases the anthropometric model is least one of constructed and updated based on the sensing data.

In some embodiments, the method/system are configured and operable for include: processing the sensing data to determine locations of two ears of the user; determining two acoustic field propagation paths from the selected one or more transducer units towards the two ears of the user respectively; and operating the selected transducer unit(s) for transmitting acoustic signals to the determined locations of the two ears along the two respective acoustic field propagation paths. In some cases the method further includes determining respective relative attenuations of acoustic field propagation along the two propagation paths to the two ears of the user, and equalizing volumes of the respective acoustic fields directed to the two ears of the user based on the relative attenuations, to thereby provide balanced binaural audible sound to the user.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a block diagram of the audio communication system, FIG. 1B schematically exemplifies deployment of the audio communication system, and FIG. 1C shows a block diagram of an end unit of the audio communication system;

DETAILED DESCRIPTION OF EMBODIMENTS

Figure 1A:
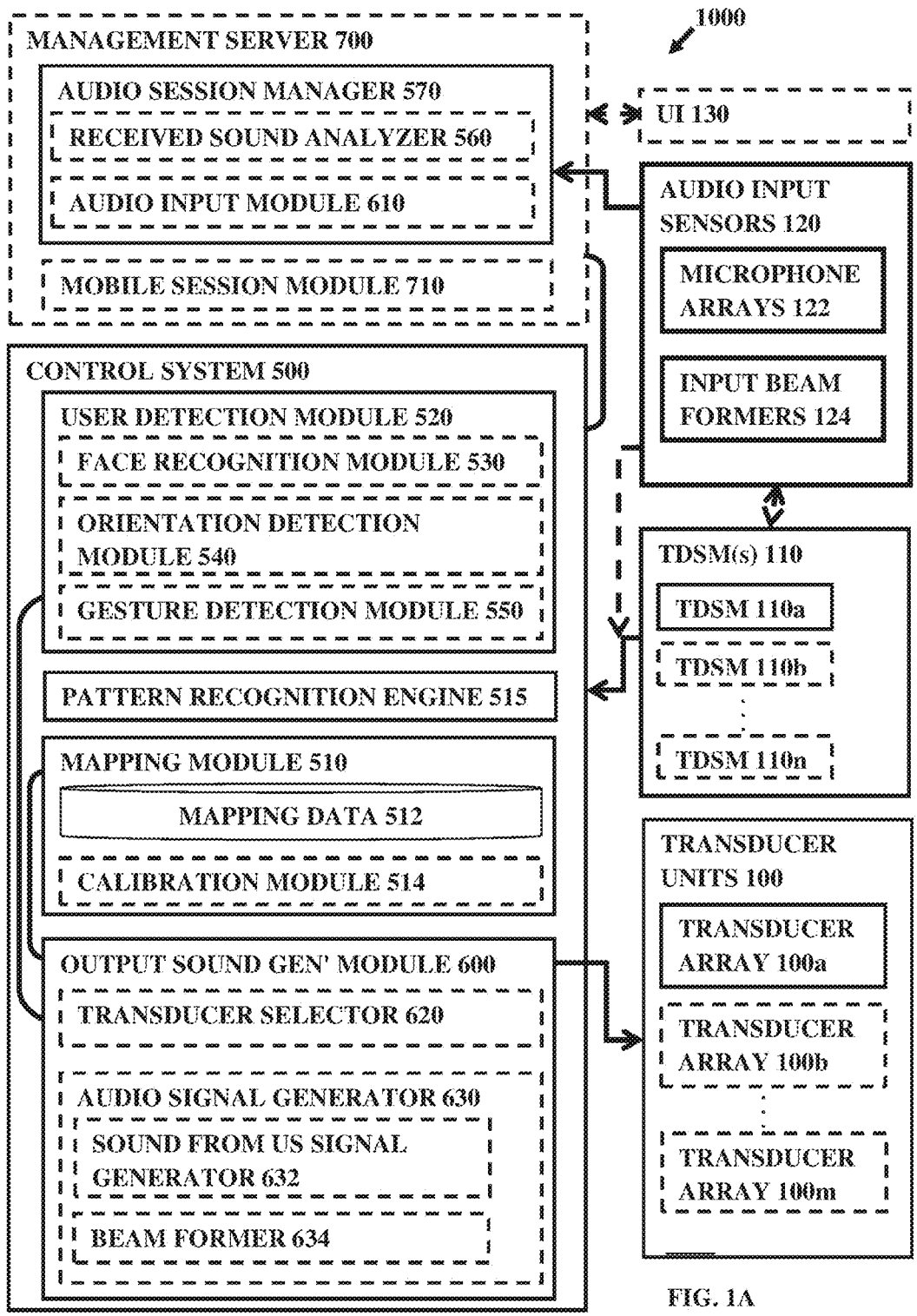
FIGS. 1A to 1C schematically illustrate an audio communication system according to some embodiments of the invention, whereby
Figure 1B:
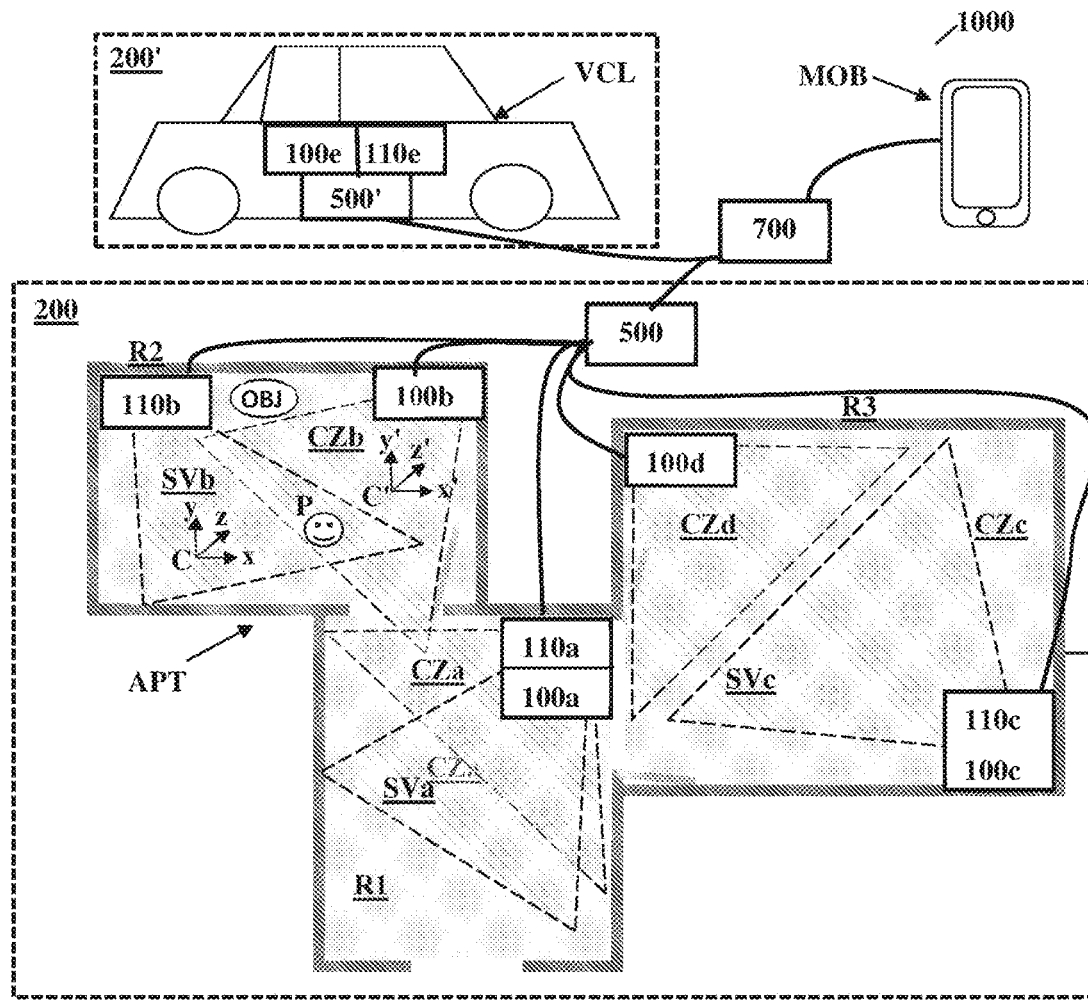
Figure 1C:
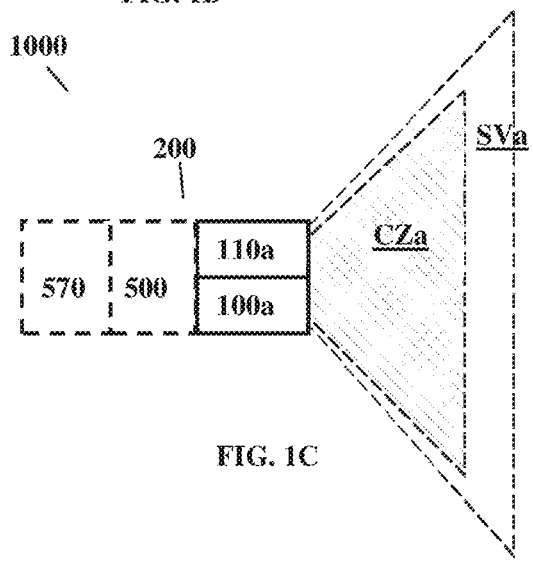

As indicated above, the present invention provides a system and method for providing private and hand-free audible communication within a space. Reference is made together to FIGS. 1A to 1C, whereby FIG. 1A to 1C, whereby FIG. 1A is a block diagram of an audio communication system 1000 according to an embodiment of the present invention, FIG. 1B schematically illustrates an exemplary deployment of the audio communication system 1000 and FIG. 1C is a block diagram exemplifying the configuration of an end unit 200 of the audio communication system 1000 according to some embodiments of the invention.

System 1000 includes one or more acoustic/sound transducers units 100, each may typically include an array of sound transuding elements which can be operated for generating and directing directive sound beam(s) towards selected directions. For instance, transducer array units 100a and optional 100b to 100n are exemplified in the figure). The transducer array units 100a-100n may each be in charge of a specific region/area which is in the line of sight of the respective transducer unit. Additionally, the audio communication system 1000 also includes one or more three dimensional sensing devices/module (TDSM) 110, each including one or more sensors which are capable for acquiring sensory data indicative of the three dimensional structures of/in the environment at which they are placed. The TDSM modules 110 may for example includes passive and/or active sensors, such as one or more cameras (e.g. operating in the visual and/or infra-red (IR) wavebands), and/or depth sensors (e.g. light detection and ranging (LIDARs) and/or structured light scanners), and/or echo location sensors (e.g. sonar), and/or any combination of sensors as may be known in the art, which are capable of sensing the 3D structure of the environment and provided sensory data indicative thereof. It should be noted that in some cases the TDSM modules 110 are configured to utilize/operate the transducer units 100 also as sonar modules for sensing the 3D structure of the environment. In this case, the transducer units 100 may be adapted to operate in both transmission and reception modes of ultra-sonic signals, and/or the audio input sensors 120 and/or other sensors associated with the TDSM modules 110 may be configured and operable in the ultra-sonic wavelength(s) for sensing/receiving the reflected/returned sonar signals.

In the present example, the TDSM(s) 110 include TDSM unit 110a and optionally additional TDSM units 110b to 110m whereby each of the TDSM units is capable of monitoring the 3D structure of an area of a given size and shape. Accordingly, at each space/site (e.g. room/office/vehicle space) to be serviced by the audio communication system 1000, at least one TDSM 100 and possibly more than one TDSM 100 is installed in order to cover the main regions of that space and provide the system 1000 with 3D sensory data indicative of the structure of that space. Additionally, the system includes a control system 500 (also referred to herein as local audio system) that is connectable to the TDSM(s) 110 and to the transducer unites 100 and configured and operable to receive from the TDSM(s) 110 3D sensory data indicative of the 3D structure of one or more spaces at which the TDSM(s) 110 are located/furnished, and operate the transducer unites 100 located at these spaces so as to provide designated audio data/signals to users in these spaces.

According to some embodiments of the present invention, the control system 500 includes a user detection module 520 connectable to one or more of the TDSM(s) 110 (e.g. via wired or wireless connection) and configured and operable for processing the 3D sensory data obtained therefrom to detect, track and possibly also identify user(s) located in the space(s), at which the TDSM(s) 110 are installed. To this end, the user detection module 520 is configured and operable to process the sensory data to determine spatial location elements within the space(s)/sensory-volume(s) covered by the TDSM(s), and in particular detect the location of at least one of a user's head or a user's ear within the sensing volumes of the three dimensional sensor modules.

Generally, the TDSM(s) 110 may be located separately from the transducers 100 and/or may be associated with respective sensing coordinate systems (with respect to which the 3D sensing data of the sensing volumes sensed thereby is provided).

Indeed, as shown for Example in FIG. 1B, the sensing coordinate systems may be different from the coordinate systems of the acoustic transducers 100. For example in FIG. 1B the coordinate system C of the TDSM 110b in room R2 is shown to be different than the coordinate system C' of the transducer unit 100b covering that room. Accordingly, the TDSM 110b can detect/sense the location of the user P (e.g. its head/ears) which is located within the sensing volume SVb and provide data indicative of the user's head/ear(s) location relative to the coordinate system C of the TDSM 110b. The transducer 100b may be arranged in the room at a different location and/or at different orientation and may generally be configured to operate relative to a different coordinate system C' for directing sound to the user P located at the transducer's 100b coverage zone CZb.

Therefore, according to some embodiments of the present invention, in order to bridge between the different coordinate systems of the TDSM(s) 110 and the transducers 100, which may be installed at possibly different locations and/or orientations, the control system 500 includes a mapping module 510, which is configured and operable for mapping between the coordinate systems of the TDSM(s) 110 with respect to which the sensory data is obtained, and the coordinate systems of the transducers 100 with respect to which sound is generated by the system 1000. For instance, the mapping module 510 may include/store mapping data 512 (e.g. a list of one or more coordinate transformations, such as C to C' transformation), which maps between the coordinates of one or more TDSM(s) 110 to the coordinates of one or more corresponding transducers 100 that pertain-to/cover the same/common space that is sensed by the corresponding TDSMs 110.

Optionally, the mapping module 510 also includes a calibration module 514 which is configured and operable for obtaining the mapping data between the TDSMs 110 and the transducers 100. This is discussed in more details below.

Additionally, the control system 500 includes an output sound generator module 600 (also referred to interchangeably hereinbelow as sound processing utility/module). The output sound generator module 600 (the sound processing utility) is connectable to the one or more transducer units 100 and is adapted to operate the one or more transducer units 100 to generate acoustic signals to be received/heard by one or more of the users detected by the user detection module 520.

To this end, the output sound generator module 600 may be associated with an audio input module 610 (e.g. external audio source) of an audio session manager 570 of the system 1000. The audio input module 610 is configured and operable for receiving and providing the output sound generator module 600 with sound data to be transmitted to at least one predetermined user of interest (e.g. user P) in the spaces (e.g. the apartment APT) covered by the system.

According to some embodiments, the output sound generator module 600 includes a transducer selector module 620 configured and operable for selecting the at least one selected transducer (e.g. 100a) out of the transducers 100, which is suitable (best suited) for generating and directing a sound field to be heard by the predetermined user (e.g. by user P).

To this end, according to some embodiments, the output sound generator module 600 is connected to the user detection module 520 for receiving therefrom data indicative of the location(s) of the user(s) of interest to be serviced thereby (e.g. the locations may be specified in terms of the coordinate systems C of at least one of the TDSM(s) 110). The output sound generator module 600 is connected to the mapping module 510 and is adapted for receiving therefrom mapping data 512 indicative of the coordinate mapping (e.g. transformation(s)) between the coordinate system of the TDSM(s) 110 sensing the user of interest P (e.g. coordinates C of TDSM 110b) and the coordinate system of one or more of the transducers 100 (e.g. coordinates C' of transducer 100b).

The transducer selector receives the location of the predetermined user from the user detection module 520 (the location may be for example in terms of the respective sensing coordinate system of the TDSM (e.g. 110b) detecting the user P. The transducer selector module 620 is configured and operable for utilizing the mapping data obtained from the mapping module 510 (e.g. coordinate transformation C-C' and/or C-C") for converting the location of the head/ears of the detected user P into the coordinate spaces/systems of one or more of the transducers 100. Optionally, the transducer selector module 620 may be adapted to also receive data indicative of structures/objects OBJ (e.g. elements such as walls and/or furniture and/or surfaces thereof) located in the vicinity of the user of interest P (e.g. in the same space/room as the user P shown in FIG. 1B). Then, the transducer selector module 620 utilizes the mapping data obtained from the mapping module 510 (e.g. coordinate transformation C-C' and/or C-C") for converting the location and possibly also the orientation of the head/ears of the detected user P into the coordinate spaces/systems of one or more relevant transducers 100. The relevant transducers being for that matter, transducers within which coverage zones the user P is located (to this end excluded are the transducers which are not in the same space and/or which coverage zones do not overlap with the location of the predetermined user). Possibly, at this stage the transducer selector module 620 utilizes the mapping data obtained from the mapping module 510 to convert the location of the objects OBJ in the space to the coordinate of the relevant transducers. Then based on the location and orientation of the user's head/ear(s) in the coordinate spaces of the relevant transducers 100, the transducer selector module 620 determine and selects the transducer(s) (e.g. 100b) whose location(s) and orientation(s) are best suited for providing the user with the highest quality sound field. To this end, the transducer selector 620 may select the transducer(s) (e.g. 100b) which have the shorter un-obstructed line of sight to the predetermined user P (to his head/ears). In case no transducer with un-obstructed line of sight is found, the transducer selector 620 may utilize the pattern recognition to process the 3D sensory data (e.g. 2D and/or 3D images from the TDSMs) to identify acoustic reflectors such near the user, and select one or more transducers that can optimally generate a sound field to be reached to the user via reflection from the objects OBJ in the space. To this end, the transducer selector 620 determines a selected transducer (s) e.g. 100a to be used for servicing the predetermined user to provide him with audio field, and determines an audio transmission path (e.g. preferably direct, but possibly also indirect/via-reflection) for directing the audio field to the head/ears of the user.

The output sound generator module 600 also includes an audio signal generator 630, which is configured and operable to generate audio signals for operating the selected transducer to generate and transmit the desired audio field to the predetermined user. In this regard, the audio signal generator 630 encodes and/possibly amplifies the sound data from the audio input module 610 to generate audio signals (e.g. analogue signals) carrying the sound data. In this regard, the encoding of the sound data on signals to be communicated to speakers of the selected acoustic transducer (e.g. 100a) may be performed in accordance with any known technique.

Particularly, in some embodiments of the present invention, the audio signal generator 630 is configured and operable for generating the audio field carrying the sound data only in the vicinity of the user, so that the user privately hears the audio field transmitted to him, while user's/people in his vicinity cannot hear the sound. This may be achieved for example by utilizing the sound from ultrasound technique disclosed in WO 2014/076707, which is assigned to the assignee of the present invention and incorporated herein by reference. To this end the audio signal generator 630 may include a sound from ultrasound signal generator 632 which is configured and operable for receiving and processing the sound data while implementing the private sound field generation technique disclosed in WO 2014/076707, so as to produce private sound field which can be heard only by the predetermined user to which it is directed. To this end, the relative location of the user, relative to the selected transducer (as obtained from the transducer selector 630), is used to generate ultrasonic beams which are directed from the transducer to the location of the user and configured to have a non-linear interaction in that region forming the localized sound field at the region of the user.

Additionally, the system may include a beam forming module 634 configured and operable for processing the generated audio field carrying signals to generate a plurality of beam-formed signals, which when provided to the plurality of transducer elements of the selected acoustic transducer(s) (e.g. 100b) generate an output acoustical beam that is focused on the user (on his head and more preferably on his ears). The beam forming module 634 of the present invention may be configured and operable for implementing any one or more of various known in the art beam forming techniques (such as phase array beam forming and/or delay and subtract beam forming), as will be readily appreciated by those versed in the art.

Thus the control system 500 is configured and operable to process the sensory data obtained from the TDSM(s) 110 in order to determine user(s) in the monitored space to which audio signals/data should be communicated and operate the one or more transducer units, 100a and 100b, in order to provide the user(s) with hand free private audio sessions in which the user(s) privately hear the sound data designated thereto without other users in the space hearing it.

According to some embodiments, the system includes an audio session manager 570 which is configured and operable for managing audio sessions of one or a plurality of users located in the space(s) covered by the system 1000. The audio session manager 570 may be adapted to manage various types of sessions including for example unilateral sessions in audio/sound data is provided to the user (e.g. music playing sessions, television watching sessions, gaming and others) and/or bilateral sessions in which audio/sound data is provided to the user and also received from the user (e.g. phone/video calls/conference sessions and/or voice control/command sessions and others). To this end, the session manager may manage and keep track of a plurality of audio sessions associated with a plurality of users in the space(s) covered by the system which distinguishing between the sounds to be communicated to the different respective users and also distinguishing between the sounds received from the different respective users.

To this end, optionally in implementations in which the system is configured to enable users to conduct bi-directional (bi-lateral) audio communication sessions (such as telephone calls), the system 1000 includes one or more audio input sensor modules 120 distributed in the spaces/sites covered by the system. Each audio input sensor module 120 is configured and operable for receiving audio information from user(s) at the space covered thereby. The audio session manager 570 includes an input sound analyzer 560 adapted to process the audio information from the audio input sensor module 120 in order to distinguish between the sounds/voices of different users.

For example, the audio input sensors 120 may be configured and operable as directive audio input sensors, which can be used to discriminate between sounds arriving from different directions. Accordingly, the input sound analyzer 560 is configured and operable for discriminating the input sound from different users in the same space based on the different relative directions between the users and one or more of the directive audio input sensors 120 in that space.

For instance, in some cases a directive audio input sensor 120 is implemented as a microphone array. The microphone array may include a plurality of directive microphones facing different directions, or a plurality of microphones (e.g. similar ones) and an input sound beam former. Accordingly, the array of differently directed directive microphones, and/or an input sound beam former (not specifically shown) connected to the array of microphones, provides data indicative of the sound received from different directions in association with the directions from which they are received. The input sound beam former may be configured and operable to process the signals received by the microphone array according to any suitable known in the art beam forming technique in order to determine the directions of different sounds received by the array. The input sound analyzer 560 may be configured and operable to associate the sounds arriving from different directions with different respective users in the monitored space(s), based on the locations of the users in these spaces, as determined for example by the user detection module 520. More specifically, the input sound analyzer 560 may be adapted to utilize user detection module 520 in order to determine the location of different users in the space(s) monitored by the system 1000. Then, utilizing the mapping module 510 (which in that case also holds mapping data relating the coordinates (locations, orientations, and sensing characteristics) of the microphone arrays 120 to the coordinates of the TDSMs 110), the input sound analyzer 560 determines to which user belongs the sounds arriving from each specific direction. Accordingly, the sound analyzer 560 associates the sound coming from each user's direction with the session of the user. Thus, whereby the output sound generator module 600 provides sounds privately to respective users of the system and the sound analyzer 560 separately/distinctively obtains the sound from each user, a bilateral audio communication can be established with each of the users.

As indicated above, the system 1000 may be configured as a distributed system including the one or more transducer units (typically at 100) and the one or more TDSMs (typically at 110) distributably arranged in desired spaces, such as a house, apartment, office, vehicle and/or other spaces, and a management server system 700 connected to the distributed units. For instance, FIG. 1B shows a distributed system 1000. The system 1000 includes TDSMs 110a to 110c and arranged in rooms R1 to R3 of an apartment APT and connected to the control system 500 which manages the audio communication sessions within the apartment, The system 1000 also includes the TDSM 110e and the transducer 100e arranged in a vehicle VCL, and connected to the control system 500' which manages the audio communication sessions within the vehicle VCL. In various implementations of the system, the control systems 500 and 500' (which are also referred to herein as local audio systems) may be connected to their respective TDSMs 110 and transducers 100 by wired or wireless connection. The management server system 700 manages the audio communication sessions of the users while tracking the locations of the users as they transit between the spaces/sites covered by the system (in this case the rooms R1-R3 of the apartment APT and the vehicle VCL).

The server system 700 may for example reside remotely from the control systems (local audio systems) 500 and/or 500' (namely remotely from the apartment APT and/or from the vehicle VCL) and may be configured and operable as a cloud based server system servicing vocal communication to the user as he moves in between the rooms of the apartment APT, from the apartment to the vehicle VCL and/or while he drives the vehicle VCL. To this end the, control system 500 or one or more modules thereof may be configured and operable as a cloud based service connectable to the plurality of TDSMs and transducers from remote, e.g. over network communication such as the internet. To this end the control systems 500 and/or 500' and possibly also other modules of the system 1000, except for the TDSMs 110 and the transducer array units 100 may be implemented as cloud based modules (hardware and/or software) and located remotely from the spaces (e.g. apartment APT, vehicle VCL and/or office) which are covered by the system and adapted to communicated with the TDSMs 110 and the transducer array units 100. Accordingly, there may be no physical hardware related to the control systems 500 and/or 500' at the spaces covered by the system.

To this end, the server system 700 communicates with the control systems 500 and 500' to receive therefrom data indicative of the location of the user of interest (P). To this end the server system 700 receives user detection data obtained from the user detection modules 520 of the control systems 500 and 500' by processing the sensing data gathered by the varies TDSMs 110 who sense the users of interest (e.g. user P) while he moves in the various spaces (rooms of the apartment and/or the vehicle). Accordingly, the server system 700 tracks the user as he moves between the various spaces, while managing the audio session(s) of the user as he moves. In case the user, while in active audio session, moves from the coverage spaces of the TDSMs and transducers of one/first control system (e.g. 500) to the coverage zone of another/second control system (e.g. 500'), the server system 700 operates the second control system 500' to continue the active audio session of the user.

Indeed, in some cases the user may move to places/location at which no TDSMs 110 and no transducers 100 are installed. For example, when the user walks on the path between the apartment APT and the vehicle VCL. Therefore in some embodiments that the server system 700 further includes a mobile session module 710 (e.g. a modem) in which is capable of transferring the audio communication session to a mobile device MOB of the user (e.g. a preregistered mobile device such as a mobile phone prerecorded in the server 700 as associated with the user) in order to allow the user to maintain continuous audio session while he transit between different spaces. Thus, once the user exit the coverage zones of the system, he can continue with his audio session via his phone.

Alternatively, or additionally, in some implementations, the system 1000 includes one or more full package units which include at least one transducer unit 100, at least one TDSM 110, and optionally an input audio sensor (microphone array) 120 packaged together in the same module. This is illustrated for example in FIG. 1C, and in FIG. 1B see modules 100a+110a and 100c+110c. Optionally the full package units also include the control unit 500 and the audio session manager 570.

In this case the transducer unit 100 and the TDSM 110 are preinstalled within the package and the relation between the coordinates of their sensing volumes and coverage zones are predetermined apriority and coded in the control unit's mapping module 510 (e.g. memory). Accordingly, no calibration of the mapping between the TDSM and the transducer is required in this case. To this end full package unit of this example is configured to be deployed in a certain space, without calibration and may be used to provide private audio communication session to the user at the space at which it is deployed.

Generally, however, calibration may be required in order to determine the mapping data associating the coordinate spaces/systems of the transducers (e.g. C') the coordinates spaces/systems of the TDSMs (e.g. C), and possibly also the coordinate system of the audio input sensors 120. More specifically calibration may be required in cases where the transducers and the TDSMs are located separately as illustrated in FIG. 1B, To this end, optionally the mapping module 510 includes a calibration module 514 configured and operable for obtaining and/or determining calibration data indicative of the relative locations and orientations of the different TDSMs and transducers and possibly also of the audio input sensors 120 that are connected to the control system 500.

In some embodiments, the calibration module 514 is adapted to receive manual input calibration data from a user installing the system 1000. For instance such input data may be indicative of the relative locations and orientations of the TDSMs and the transducers, and the calibration module 514 may be adapted to utilize this data to determine mapping data indicative of coordinate transformations between the coordinates of the TDSMs 110 and those of the transducers 100 and possibly audio input sensors 120.

Alternatively or additionally, the calibration module 514 may be adapted to implement and automatic calibration scheme in which the sensing capabilities of the TDSMs 110 and possibly also the audio sensing capabilities of the audio input sensors 120 are employed in order to determine locations and orientations of the TDSMs 110 relative to the various transducers 100 and/or input sensors 120. To this end, in some embodiments the calibration module 514 utilizes the pattern recognition engine 515 in order to process the data sensed by each TDSMs 110 to identify the transducers 100 and possibly audio input sensors 120 located in the sensing zone of each TDSM and determine their relative locations and orientations relative to the TDSMs 110.

Indeed, in some embodiments, in order to identify the transducers 100 and optionally identify the audio input sensors 120, the calibration module 514 utilizes certain pre-stored reference data indicative of the appearance and/or shape of the transducers and/or the audio input sensors. This reference data may be used by the pattern recognition engine 515 to identify these elements in the spaces (sensing volumes SVa-SVn) monitored by the TDSMs.

Moreover, optionally, according to some embodiments, the transducers 100 and possibly the audio input sensors 120 are configured with a package carrying identifying markers (e.g. typically visual passive markers, but possibly also active markers such as active radiation emitting markers) and/or acoustic markers and/or other markers which aid at identifying the types and the locations and orientations of the transducers 100 and/or the audio input sensors 120 by the TDSMs. To this end, the markers should be of a type identifiable by the sensors included in the TDSMs. In such embodiments the pre-stored reference data used by the calibration module 514 may include data indicative of the markers carried by different types of the transducers 100 and/or the audio input sensors 120 along with the respective types and audio properties thereof. The reference data may be used by the pattern recognition engine 515 to identify the markers in the spaces (sensing volumes SVa-SVn) monitored by the TDSMs, and thereby determine the relative locations and orientations of the transducers 100 and optionally the audio input sensors 120.

Yet alternatively or additionally, the calibration module may be adapted to carry out an active calibration phase in which the location of the transducers is determined by sensing and processing sound field generated by the transducers during the calibration stage and locating (e.g. echo-locating) the transducers based by detecting and processing the calibration sound fields generated thereby (e.g. by employing the TDSMs 110 and/or the audio input sensors 120 to sense these sound field and process the sensed sound fields; e.g. utilizing beam forming) in order to determine the relative location and orientation of the transducers relative to the TDSMs and/or 110 and/or the audio input sensors 120.

Thereafter, once the relative locations and orientations of the transducers 100 are determined, the calibration module 514 determines the coordinate transformations between the coordinate spaces/systems of the transducers 100 (the coverage zones' CZa-CZm coordinates of the transducers 100a-100m by which the system can adjust/control the direction and/or location of the generated sound field), and the coordinate spaces of the sensing zones SVa-SVn of the TDSMs. This allows to generate the mapping data of the mapping module which enables to accurately select and operate the selected traducer in order to generate and direct a sound field towards a location of a user P detected by one of the TDSMs. Optionally, in the same way, the calibration module 514 determines the coordinate transformations between the coordinate spaces/systems of the coverage zones (not specifically shown in the figures) of the audio input sensors 120, by which the system receives the sounds from the users, and the coordinate spaces of the sensing zones SVa-SVn of the TDSMs. This allows to generate the mapping data enabling to accurately determine the user whose voice is received by the audio input sensor(s) 120.

It should therefore be noted, although not specifically shown in the figure, that the control system 500 and generally the system 1000 include one or more communication input and output ports for use in network communication and/or for connection of additional one or more elements as the case may be.

In some embodiment, system 1000 may also include one or more display units 130 connectable to the control unit 500 and configured and operable for providing display data to one or more users. The control unit 500 may receive data about location of a user from the user detection module and based on this location data, determine a suitable display unit 130 for displaying one or more selected data pieces to the user, and to further select an additional display unit 130 when the user is moving. The control unit may operate to display various data types including but not limited to one or more of the following: display data associated with another user taking part in an ongoing communication session, display data selected by the user (e.g. TV shows, video clips etc.), display commercial data selected based on user attributes determined by the system (e.g. age, sex), etc. The control unit 500 may allow the user to control the displayed data using one or more command gestures as described further below. Additionally, in some embodiments the display is also a part of a user interface of the system (possibly also including user input device such as keyboard and/or touch-screen and/or gesture detection), that is configured and operable as a system setup interface presenting the user with setup and configuration parameters of the system and receiving from the user instructions for configuring the setup and configuration parameters of the system 1000.

The one or more TDSMs 110 are configured for providing data about three dimensional arrangement of a region within one or more corresponding sensing zones. To this end the one or more TDSMs 110 may include one or more camera units, three dimensional camera units, as well as additional sensing elements such as radar unit, LiDAR (e.g. light based radar) unit and/or sonar unit. Additionally, the control unit 500 may be configured to operate the one or more transducer units 100 to act as one or more sonar units by scanning a corresponding coverage volume with an ultra-sonic beam and determined arrangement of the coverage volume in accordance with detected reflection of the ultra-sonic beam.

Figure 3:
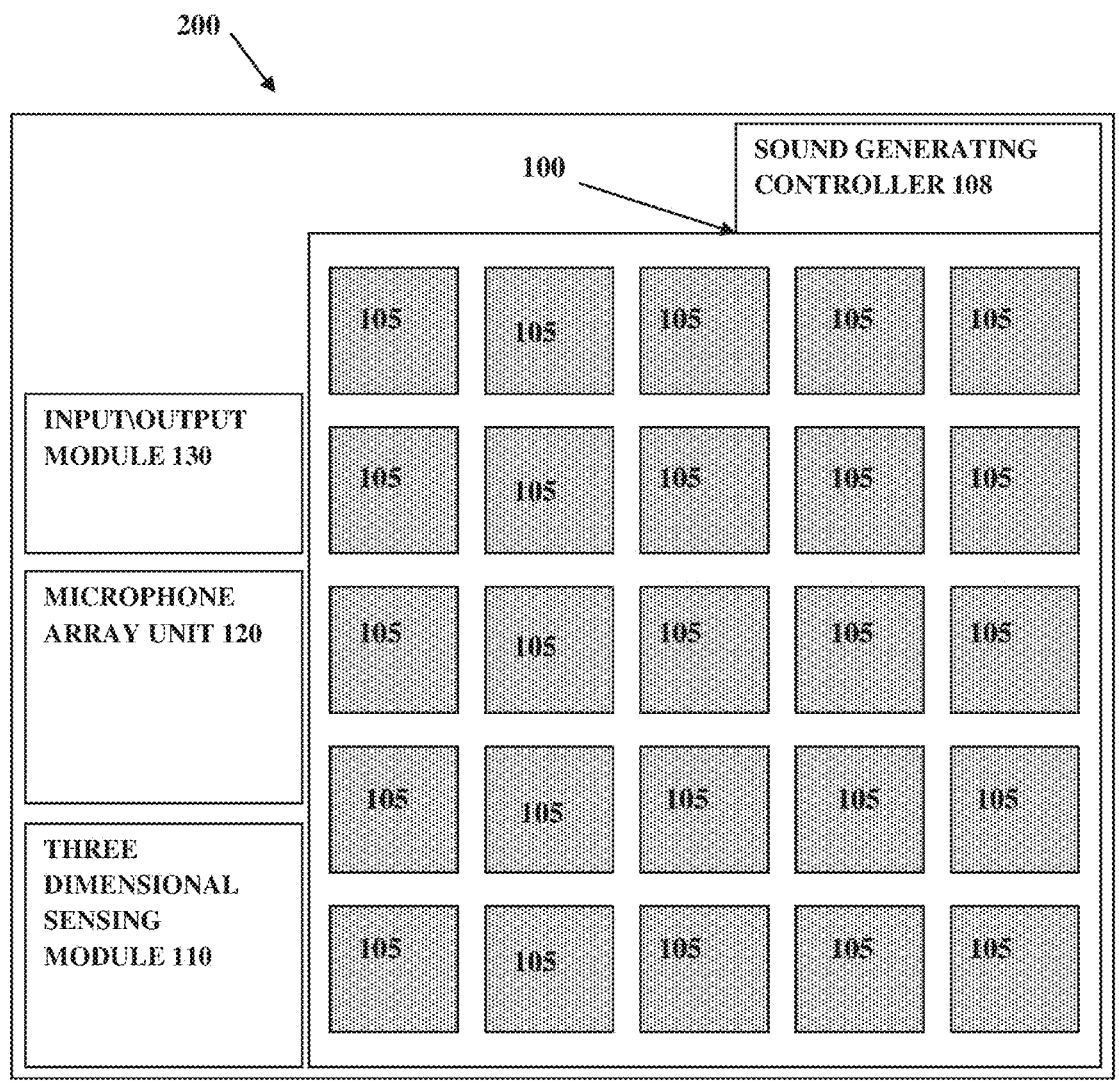
FIG. 3 exemplifies an end unit for private communication, suitable for use in the audio communication system according to some embodiments of the invention.

As indicated above, the transducer units 100 may each include an array of transducer elements. FIG. 3 shows an example of such transducer unit 100 which may be included in the system 1000 and which is particularly suited for implementing a sound from ultrasound technique (such as that disclosed in WO 2014/076707) for generating a localized sound field (e.g. a confined sound bubble) within its coverage zone (e.g. in the vicinity of the head/ear(s) of a designated user of interest). The transducer unit 100 includes: an array of transducer elements 105 configured to emit acoustic signals at ultra-sonic (US) frequency range, and a sound generating controller 108 configured to receive input data indicative of an acoustic signal to be transmitted and a spatial location to which the signal is to be transmitted. The sound generating controller 108 is further configured and operable to operate the different transducer elements 105 to vibrate and emit acoustic signals with selected frequencies and phase relations between them. Such that the emitted US signals propagate towards the indicated spatial location and interact between them at the desire location to generate audible sound corresponding to the signal to be transmitted as described further below. In this connection the terms transducer array, transducer unit and transducer array unit as used herein below should be understood as refereeing to a unit including an array of transducers elements of any type capable of transmitting acoustic signals in predetermined ultra-sound frequency range (e.g. 40-60 KHz). The transducer array unit may generally be capable of providing beam forming and beam steering options to direct and focus the emitted acoustic signals to thereby enable creation of bright zone of audible sound.

The one or more microphone arrays 120 are configured to collect acoustic signals in audible frequency range from the space to allow the use of vocal gestures and bilateral communication session. The microphone array 120 is configured for receiving input audible signals while enabling at least certain differentiation of origin of the sound signals. To this end the microphone array 120 may include one or more direction microphone units aligned to one or more different directions within the space, or one or more microphone units arranged at a predetermined distance between them within the space. In this connection it should be noted that as audible sound has typical wavelength of between few millimeters and few meters, the use of a plurality of microphone units in the form of phased array audio input device may require large separation between microphone units and may be relatively difficult. However, utilizing several microphone units having distances of few centimeters between them and analyzing audio input according to time of detection may provide certain indication about direction and location of the signal origin. Typically, it should be noted that audio input data may be processed in parallel with sensing data received by the one or more TDSMs 110 to provide indication as for the origin of audio input signals and reduce background noises.

The control/processing system 500 is configured and operable to provide hand free private sound communication to one or more users located within the space where the system is employed. Generally, the system 1000 is configured and operable to initiate, or response to initiation from a user, an audio communication session of one or more users while providing private sound region where only the selected user can hear the sound signals. To this end, the control unit 500 utilizes the sensing data about three dimensional arrangement of the space to determine location of a selected user, the transmits acoustic signals of two or more selected ultra-sonic frequencies with suitable amplitude, phase, frequencies and spatial beam forming to cause the ultra-sonic signals to interact between them at vicinity of the selected user to demodulate frequencies of audible sound. This provides a region of sound that the user can hear, while the sound cannot be heard outside of a relatively small region. To this end the control unit 500 is generally configured to provide certain data processing abilities as well as calibration data indicative of correspondence between coverage zones of the transducer array units 100 and sensing volumes of the TDSM units 110. As indicated above, such calibration data may be pre-stored or automatically generated by the system. The control system 500 and/or the audio session manager 570 may include an audio input module 610 configured and operable for communicating with one or more audio sources (e.g. local or remote communication modules and/or other audio data providers) to obtain therefrom audible data to be provided to the user. Also, the control system 500 and/or the audio session manager 570 may include an audio analyzer 560 configured and operable for receiving input audio signals from one or more microphone units 120. The control system 500 may also include a gesture detection module 550 configured and operable to process the audio signal from the microphone units 120 to determine if an audio signal indicative of one or more gestures was received from a user of the system, and possibly associate such gestures with certain instructions received from the user (e.g. user's instructions with respect to an ongoing communication session of the user and/or initiation of a communication session etc.).

The mapping module 510 is connectable to the one or more TDSM 110 units and configured and operable to receive input indicative of three-dimensional sensing data of the respective sensing volumes. The mapping module 510 is further configured for processing the input sensing data and generate a three dimensional (3D) model of the one or more respective sensing volumes of the TDSMs. In cases where the system is configured as a distributed system, e.g. as in the present example of FIG. 1B, the mapping module of one control unit 500 may be configured to communication along a suitable communication network with mapping modules of one or more other audio communication systems connected thereto. Additionally, or alternatively, the mapping module may be pre-provided with data about arrangement of the different transducer units 100, TDSM units 110 and microphone units 120 to thereby enable correlations between sensing data and recipient location determined by the TDSM units 110 and corresponding transducer units 100.

The user detection module 520 is configured and operable for receiving input sensing data from the one or more TDSMs 110 and for processing the input sensing data to determine existence and location of one or more people within the corresponding sensing volume. In this connection, the user detection module may include or be associated with a pattern recognition engine/utility 515 which is configured and operable for recognizing various objects in the image(s) obtained from the TDSMs 110. For that matter it should be understood that the images of the TDSMs 110 may include: visual images(s) and/or IR image(s) and/or echo-location image(s) and/or depth image(s) and/or composite image(s) comprising/constructed from any combination of the above. The exact types of image information obtained from the TDSMs 110 may generally depend on the specific configuration of the TDSMs used and the sensors included therein. To this end, the term image should be understood here in its broad meaning relating to a collection of data pixels indicative of the spatial distribution of various properties of the monitored space, such as various spectral colors, depth and/or other properties. The pattern recognition engine/utility 515 may utilize various types of image processing techniques and/or various pattern recognition schemes as generally known in the art, for identifying people and/or their heads/ears (e.g. P in FIG. 1B) and possibly also other recognizable objects (e.g. OBJ in FIG. 1B) in the space/sensing volume(s) monitored by the TDSM(s) and determining their location in the monitored space. This allows for separating image data portions associated with people or generally foreground objects from the background image data.

To this end in some implementations pattern recognition engine/utility 515 is configured and operable to apply pattern recognition processing to the image(s) obtained from the TDSMs 110 and to thereby generate a 3D model of the spaces monitored by the TDSMs. In turn the user detection module 520 may be adapted to determining (monitoring) and tracking (in time) the location(s) (e.g. 3D location) of one or more user(s) (e.g. of the user of interest P) based on the 3D model of the space generated by the pattern recognition engine/utility 515. Accordingly the user detection module 520 determine desired location at which to generate private sound region (sound bubble) for the user(s) of interest P, such that said location is centered on a selected user's head, and more preferably centered on/near the individual ear(s) of the user In some configuration of the system, the user detection module 520 may include, or be connected to, one or more of face recognition module 530, orientation/head detection module 540, and gesture detection module 550. Generally, it should be noted that the user detection module 520 is configured and operable for processing input sensing data utilizing one or more generally known processing algorithms to determine existence of one or more people (potential users) within the corresponding sensing volume. The face recognition module 530 may generally be configured to receive sensing data (e.g. the images of the TDSMs) indicative of existence and location of one or more selected users and to process the data by one or more face recognition techniques to determine identity of the one or more detected users. The face recognition module 530 is thus configured and operable for generating identity data indicative of the locations and identities of one or more detected user(s) and for providing the identity data to the output sound generator module 600 to enable the transducer selector 620 to select a suitable transducer unit and operate it for generating local private sound region audible to a selected user. The face recognition module 530 may be adapted to provide the identity data also to the received sound analyzer 560 so that the latter can process the sounds received from the audio input sound to determine/recognize/separate the sounds arriving from each particular user in the monitored space. In some embodiments, the face recognition module 530 may also be adapted to perform casual pairing and determine the user age/sex for purposes such as delivering commercials etc.

The output sound generator module 600, and the audio input module 610 may generally provide data about input audio signal to the user detection module 520 in accordance with location of a user, one or more gestures provided by the user (e.g. vocal gestures) and bilateral ongoing communication session.

To this end, the orientation/head detection module 540 is configured to receive at least a part of the sensory data from the TDSMs and/or at least a part of the 3D model obtained from the pattern recognition module 515, which is associated with the location of user of interest P, and to process the sensory data to determine location of the selected user's head and possibly also the orientation of the user's head. Accordingly the orientation/head detection module 540 may provide the data indicative of the location and orientation of the user's head to the output sound generator module 600 so that the latter can generate a local/confined sound field in the vicinity of (e.g. at least partially surrounding) the user's head.

As discussed in more details below, in some embodiments of the present invention the head orientation module 540 is further configured processing the sensing data from the TDSMs and/or the 3D model obtained from the pattern recognition module 515 in order to determine data indicative of the location and orientation of the user's ear(s) and provide such data to the output sound generator module 600 so that the latter can generate a local/confined audible sound field at least partially surrounding the user's ear(s).

As indicated above, the head orientation module 540 and/or the transducer selector module 620 may also generate data indicative of line of sight between one or more transducer units and the user's ears/head. In this connection it should be noted that in some embodiments the one or more transducer units 100 and the one or more TDSMs 110 may be configured within a single physical package to simplify deployment of the system.

As shown for example in FIG. 1C, in some embodiments, providing distributed processing, such physical package may also include the control system 500 and additional elements (not specifically shown) such as memory and communication utilities and power supply unit that are not specifically shown here. In some other configuration, the physical unit (namely with the same package) may include the transducer unit 100, TDSM 110, microphone unit 120, power supply unit (not specifically shown), and a communication utility (not specifically shown) providing communication with a remote control system 500, which is configured to receive and process the sensory data selectively transmit the physical distributed unit data about audio communication sessions.

Thus, a line of sight determined by the orientation detection module 540 based on sensory data may typically be indicative to line of sight of a corresponding transducer unit 100. In some configurations of the invention, the orientation detection module may be configured to select a transducer unit 100 most suitable for transmitting selected acoustic signals to a recipient in accordance with determined location of the recipient's head/ears.

Additionally, gesture detection module 550 is generally configured and operable to receive input sensing data associated with one or more selected users, and to process and analyze the input data to detect user behavior/movement associated with one or more predetermined gestures defined to initiate one or more commands. In some embodiments, the gesture detection module 550 may also be configured for receiving and processing audio signals, which are received from the user(s) and collected by the microphone array 120, to detect one or more vocal gestures associates with one or more predetermined commands.

Generally, to provide hand free audio communication, as well as to provide hand free management and control of the system, the gesture detection module 550 of the control system 500 is configured and operable to be responsive to one or more predetermined gestures (movement and/or vocal) and to initiate one or more predetermined operation commands. Further in some embodiments, some of the operation commands may include one or more commands associated with external elements configured to receive suitable indication from the audio communication system of the invention. Such operation commands may for example include command for initiating in an audio communication session (e.g. telephone conversation with selected contact person), a request for notification based on one or more conditions, and any other predetermined command defined by the system and or user. Additionally, in some configuration, the gesture detection module may be used to detect one or more gestures associated with user identity. More specifically, one or more users may be each assigned with a unique gesture that allows the audio communication system to identify the user while simplify processing of input data.

Generally, the gesture detection module 550 may be configured and operable for receiving data about user location from the user detection module 520 and receiving sensing data associated with the same location from the one or more TDSMs 110, and/or from the microphone array 120. The gesture detection module 550 is further configured to process the input data to identify whether one or more predefined gestures are performed by the user. Upon detecting one or more gestures, the gesture detection module 550 operates to generate and transmit one or more corresponding commands to the sound processor utility 600 for performing one or more corresponding actions. In some embodiments, the received sound analyzer 560 is configured to receive and analyze input vocal commands from a user in combination with the gesture module 550. To achieve that the received sound analyzer 560 may include one or more natural language processing (NLP) modules which implement one or more language interpreting technique as generally known in the art, for deciphering of natural language user commands More specifically, a user may provide vocal commands to the audio communication system while using natural language of choice. The received sound analyzer 560 may thus be configured and operable to separate/filter the user's voice from the surrounding sounds (e.g. optionally based on the location of the user of interest P as indicated above and/or based on the spectral content/color of the user's voice) and to analyze parts of the input vocal/voice data of the user (e.g. analyze the parts, which are indicated as vocal command(s) by the gesture detection module 550), to determine the actual commands the user P gives the system. Thus, this may be based on the free/natural language speech of the user and possibly also movement or other physical gestures of the user. In some additional embodiments, the received sound analyzer 560 may utilize one or more language processing techniques of a remote processing unit (e.g. cloud). To this end the control system 500 may transmit data indicative of the sound received by the audio input sensors 120 to a remote location for processing and receives analyzed data indicative of contents of the input signal.

In some configurations, the gesture detection module 550 may also be configured to operate as a wake-up module. In this case gesture detection module 550 is configured and operable to respond to communication session initiating command in the form of audible of movement gesture performed by a user. For example, such audible gesture may be configured to initiate a bilateral communication session directing a remote user (e.g. telephone conversation) in response to a keyword such as "CALL GEORGE", or any other contact name, to locate George's contact info in a corresponding memory utility and to access the input/output utility to initiate an external call to George or any other indicated contact person. It should also be noted that a contact person may be present at the same space at the time, being in a different or the same connected region of the space (i.e. within line of sight or not). In this case, a command such as "CALL DAD" may operate the user detection module 520 to locate users within the space and operate the face recognition module 530 to identify a user indicated as "Dad", e.g. with respect to the call requesting user, and to initiate a private bilateral communication session between the users. In such private bilateral communication session between two users, e.g. within different rooms, audio output of a first user is collected by a selected microphone array 120 of a first audio communication system 1000, where the first user is located within coverage zone of the first system 1000. The collected audio is transmitted electronically to a second audio communication system 1000 that operates to identify location of a second selected user (e.g. George, Dad) and to operate the corresponding selected transducer unit 100 to generate private audio signal around the ears of the second user. At the same time, audio generated by the second user is collected by the corresponding second audio communication system 1000 and transmitted similarly to be heard by the first user.

As indicated above, and illustrated in FIG. 1B, the system 1000 may be deployed in one or more connected spaces (such as in plurality of rooms of the apartment APT, and possibly also deployed in additional one or more disconnected/remote locations/spaces such as the vehicle VCL. Accordingly, the system 1000 may be configured and operable for providing seamless communication between users regardless of physical distance between them. To this end, the remote locations (e.g. the apartment APT the vehicle VCL) may be connected to similar control systems (e.g. 500 and 500') and may use, or be connected with, a common management server 700 who forms external data/audio connection/communication between control systems (e.g. 500 and 500'). To this end, the management server 700 may be located remotely from one or more of the control systems connected thereto, and may include an audio session manager 570 which manages the audio sessions of the users while also tracking the locations of the users as they move between areas/spaces controlled by the different control systems, so as to seamlessly transfer the management and operation of the audio sessions to the respective control system 500 or 500' as the user enters the zone/space controlled thereby.

To this end, the management server 700 is actually connected to one or more end units, e.g. 200, 200', whereby each end units controls a certain one or more connected spaces (e.g. rooms) and manages the audio sessions of users within these spaces. Each such end unit may be configured and operable as described above with reference to FIGS. 1B and 1C and may typically include at least one of transducer array unit 100, TDSM unit 110 and microphone unit 120. The remote connection between the end units, e.g. 200, 200', and the management server 700 may utilize any known connection technique including, but not limited to, network connection, optical fiber optic, etc.

The one or more remote location may include one or more corresponding additional audio server unit providing sub-central processing scheme, a plurality of additional audio server units providing distributed management, or connected remotely to a single audio server unit to provide central management configuration. For example, the processing unit 500 may be connected to external server (cloud) where all of the users' locations are gathered. When, at a certain place, the user detection module 520 of the processing unit 500 recognizes a selected user, it reports to the external server 700 of its location, thus diverting all communications (internal or external) to that specific processing unit 500, to be directed to the selected user/recipient.

Also, as indicated above, the control/processing unit 500 may generally include an orientation detection module 540 configured to determined orientation of a user's head in accordance with input sensory data from the one or more TDSMs 110 and the 3D model of the sensing volume. The orientation detection module 540 is thus configured for determining orientation of at least one of the user's head or ear(s) with respect to location of the TDSM 110, and preferably with respect to the transducer unit 100. The orientation detection module 540 may thus generate an indication whether at least one of the at least one user's ears being within line of sight with the at least one transducer unit. Based on the determined location and orientation of the user's ears, the processing unit 500 may utilize a direction module, not specifically shown, configured for receiving data indicative of location and orientation of the user's head/ear(s) and processing the data in accordance with 3D model of the space to determine one or more optimized trajectories for sound transmission from one or more selected transducer units to the user's head/ear(s).

Generally, an optimized trajectory may be a direct line of sight from a selected transducer to the user's head/ear(s). However, when such direct line of sight does not exist, or exists but based on a transducer unit located at a relatively large distance with respect to other trajectories, reflection of acoustic signals or other techniques may be used. More specifically, when a direct line of sight between a transducer unit and the user's head/ears cannot be determined, the processing unit 500 may operate the sound processor utility 600 to direct the local sound region at a point within line of sight of the selected transducer unit 100, which is as close as possible to the user's ears.

It should be noted that generally the private sound region may be defined as a region where outside of it the sound intensity is reduced by, e.g. 30 dB, thus, the sound may still be noticeable at very close proximity to the selected region and enable the user to identify the sound and possibly move around to a better listening location.

Alternatively or additionally, in case an optimized trajectory in the form of a direct line of sight between a transducer unit 100 and the user's head P is not found, the sound processing utility 600 and more specifically the transducer selector module 620 thereof may operate to determine an indirect path between one of the transducers 100 to the user's head P. Such an indirect path may include a direct path form the one or more of the transducers 100 to one or more acoustically reflective objects OBJ located in the vicinity of the user P. To this end the transducers selector 620 may receive the 3D model of the spaces monitored by the TDSMs which is generated by the pattern recognition engine/utility 515 and utilize that model to determine one or more objects OBJ which are located near the user (e.g. within a predetermined distance therefrom), and which may have sufficient acoustic reflectivity that can be exploited for indirect transmission of sounds to the user P. To this end, in some embodiments the pattern recognition module 515 also includes an object classifier (not specifically shown) that is configured and operable to classify recognized objects in to their respective types and associate each object type with a certain nominal acoustical reflection/absorbance parameters (e.g. acoustic spectrum of reflectance/absorbance/scattering) which typically depend on the structure and materials of the objects. Accordingly, in determining an indirect path (also referred to herein as a reflective-type trajectory) from a selected transducer unit to the user's head/ears, the transducer selector 620 may simulate/calculate the attenuation of the sound field (possibly calculate a per frequency attenuation profile) for each candidate path between a transducer 100—a reflective object OBJ—the user P. To this end, the transducer selector 620 may be configured and operable for employing any number of acoustic simulation/estimation techniques to estimate the acoustic field attenuation per each given candidate transducer 100 and candidate reflective object OBJ, based on the distance from the candidate transducer 100 to the object OBJ and from the object OBJ to the user (e.g. which may be indicated by the 3D model) and based on the acoustical reflection parameters of the object OBJ. A person of ordinary skill in the art would readily appreciate the various possible techniques which can be implemented by the transducers selector 620 to estimate the acoustic field attenuation associated with each indirect/reflection path to the user. Among the possibly several candidate indirect paths (possibly involving different transducers and/or different objects) the transducers selector 620 selects the path(s) having the least acoustic attenuation and/or the least distortive acoustic attenuation, and thereby selects one and possibly more than one transducers to be used for in direct transmission acoustic signal to the user P via reflection from the object(s) in the space. To this end, in case there is no short enough direct path between any of the transducers 100 to user P, the transducers selector 620 utilizes the 3D model of the space (region of interest) and to determine an indirect (reflection based) sound trajectory the includes a reflection from a surface of an object (e.g. wall) of an towards the hidden user's ear.

Since the reflection may cause reduction in acoustic intensity and greater spreading of the signal, a trajectory including a single reflection is typically preferred over greater number of reflections.

In case the one or more transducer units 100 is used to generate sonar-like sensing data for forming the 3D model, the model may also include certain indications about acoustic reflections from the surfaces. Accordingly, the object classifier may utilize such sonar-like sensing data to determine the acoustic reflection properties of the objects in the space.

Figure 2:
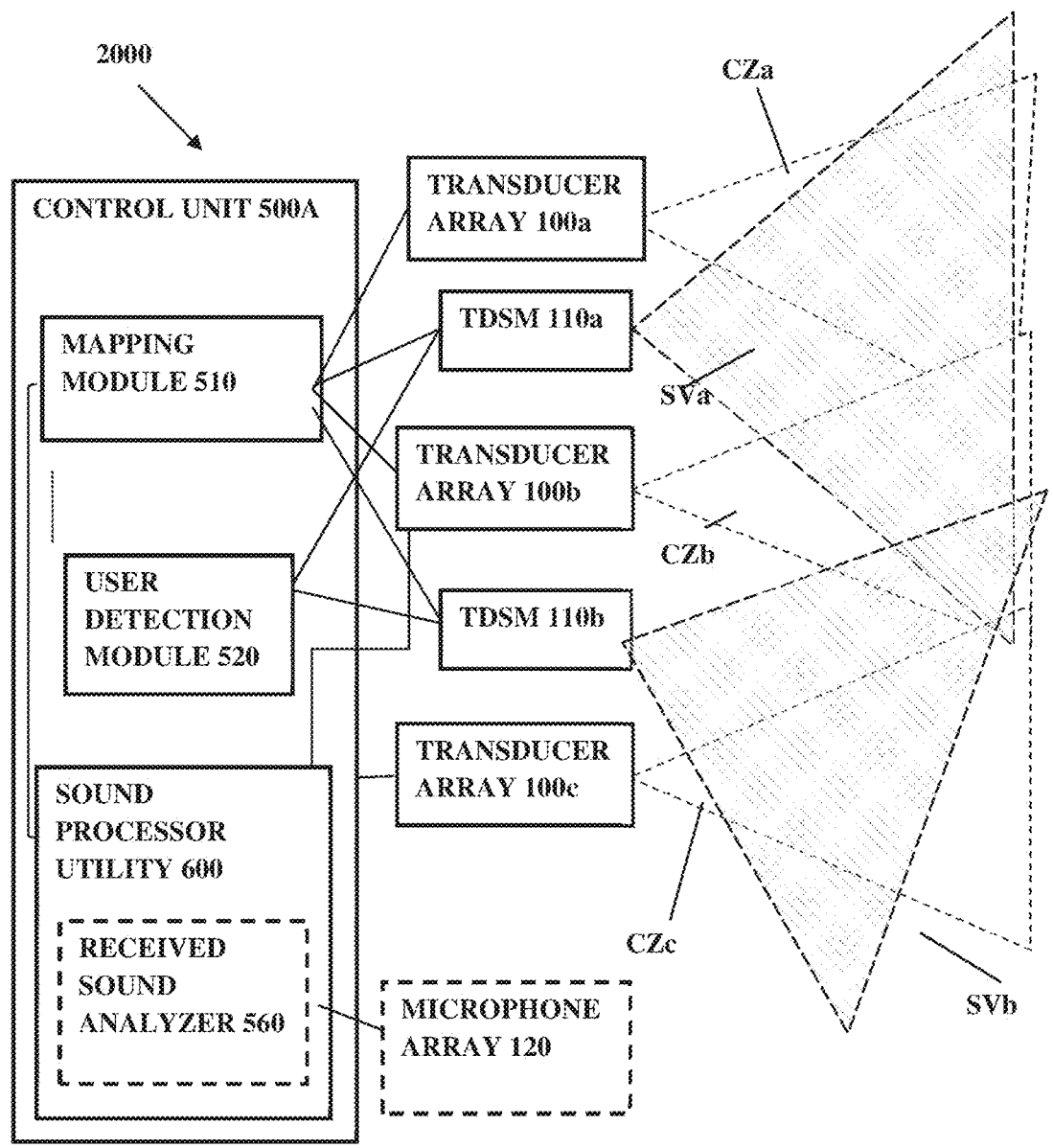
FIG. 2 illustrates an additional example of audio communication system according some embodiments of the present invention, utilizing central control unit.

As indicated above, the audio communication system according to the present invention may utilize centralized or distributed management. This is exemplified in FIG. 2 illustrating an audio communication system 2000 including central control unit 500A (acting as an audio communication server) connectable to a plurality of transducer units, transducers 100a, 100b and 100c are exemplified herein, and to a plurality of TDSM units, 110a and 110b are exemplified. Each of the transducer units (100a, 100b or 100c) may be mounted at a selected location in a space to enable transmission of acoustic signals forming local sound region at a selected location within a respective coverage zone (CZa, CZb or CZc as exemplified in the figure) as describe below with reference to FIG. 5. Additionally, the TDSM units, 110a or 11b, are configured to be mounted at selected location within a space to provide sensory data indicative of respective sensing volumes (SVa and SVb as exemplified in the figure). Additionally, the system may include one or more microphone arrays 120 employed at selected locations and configured to provide data about acoustic signals collected from the space where the system is employed.

It should be noted that the sensing volumes of the different TDSM units 110 and the coverage zones of the transducer units 100 may be separate physical units or packed together in a single common physical unit. Additionally, the transducer array units 100 and the TDSM units 110 are preferably mounted such that the total space where the system is mounted is covered by coverage zones CZ of the transducer array units and sensing volumes SV of the TDSM units. Preferably, each transducer array unit 100 is paired with a corresponding TDSM unit 110, to cover a common region being both within coverage zone of the transducer unit 100 and sensing volume of the TDSM unit 110.

The transducer units 100 and the TDSM units 110 are commonly connectable to one or more centralized control unit 500a configured to manage input and output data and communication of the system as described above with reference to control unit 500 in FIG. 1A. The control unit 500a is generally configured to act as an audio communication server configured for managing private audio communication between different users within the space where the system is employed and input and output communication using a communication network (e.g. telephone communication, internet communication etc.).

The control unit 500a generally includes at least a mapping module 510, user detection module 520 and sound processor utility 600. Generally, the control unit may also include, or be connectable to, one or more memory utilities and input and output communication ports.

The mapping module 510 is configured as described above to receive input sensing data from the TDSM units 110, and in some configurations from the transducer units 100 and to provide mapping data indicative of a relation between the sensing volumes and the coverage zones. Such mapping data may also include the 3D model of the space where the system is employed. To this end the mapping module may generally obtain calibration data (e.g. automatically generated and/or manually inputted) about locations in the space where the different transducer units 100 and TDSM units 110 are deployed, and preferably a schematic map of the space itself.

The user detection module 520 is connectable to the three dimensional sensor modules (TDSM units) 110 for receiving sensory data indicative of objects' arrangement and movement thereof in the corresponding sensing volumes, SVa and SVb as shown in the figure. The user detection module 520 is further configured and operable for processing the input sensory data to determine existence and spatial location of one or more user's in the corresponding space. As indicated above with reference to FIG. 1A, the user detection module 520 may also include a face recognition module 530, orientation detection module 540 and gesture detection module 550. Typically, in some embodiments of the invention, the user detection module is operable to receive input command indicating a specific user, and to process sensory data from the plurality of TDSM units 110 to determine if the specific user is located within any of the sensing volumes covered by the system, identify the user by facial or other recognizable features and determine spatial location of the user, suitable for transmission of local, private, sound region that will be heard by the user. Preferably, the user detection module is capable to provide spatial coordinates indicative of location of at least one of the user's head/ears to enable accurate and direct transmission of sound to the user's ears.

The sound processor utility 600 is connectable to the transducer units 100 and adapted to receive sound data indicative of sound to be transmitted to a selected user and to operate a selected transducer unit to generate and transmit acoustic signals to thereby play the desired sound signal to the user privately.

In this connection, the sound processor utility 600 may be responsive to input data indicative of a selected user designated as target for a message and data indicative of the acoustic content of a message to be played to the user. In response to such input instructions, the sound processor utility may communicate with the user detection module 520 for spatial location of the specified user; receive data about corresponding transducer covering the determined spatial location from the mapping module 510; and operate the selected transducer 100 to transmit suitable acoustic signals to thereby form a private sound region carrying the message to the specified spatial location. As also indicate, above, the user detection module 520, and the orientation detection module thereof, may preferably provide data indicative of location of at least one or the user's ears to provide accurate and private audio communication.

Additionally, and as indicated above, according to some embodiments the control system 500 may also include an received sound analyzer 570 configured and operable to be connected to one or more microphone arrays 120 employed in the covered region/space and for receiving input audio data from the microphone arrays 120 to enable bilateral communication session. Generally, the received sound analyzer 570 is process input audio signals received from one or more selected microphone arrays 120 in the connected sites and determine acoustic data generated by a selected user, e.g. a user initiating or participating in a communication session. To this end the one or more microphone arrays 120 may be configured as directional microphone array using time or phased delay to differentiate input acoustic data based on location of source thereof. Additionally, or alternatively, the sound processor utility may utilize ultra-sonic reflections received by a transducer unit 100 transmitting acoustic signals to a user, and correlate the ultra-sonic reflections with audible signals collected by a microphone arrays 120 to determine sound portions associated with the specific user.

Generally, it should be noted that the one or more microphone units 120 are typically connectable to the control/processing unit 500a (or 500 as exemplified in FIG. 1A) to provide audio input data. Such audio input data may be associated with one or more vocal gestures and/or be a portion of bilateral ongoing communication session. To this end the user detection module 520 as well as the sound processing utility 600 are typically configured and operable for receiving input audio data and for determining one or more vocal gestures and/or operating to process content of the data for operational instructions and/or relating to the input audio data as part of ongoing communication session and transmitting the data to a local or remote recipient.

As indicated above, the audio communication system described herein utilizes one or more control units (500 or 500a) connectable with one or more transducer units 100, TDSM units 110 and possibly one or more microphone arrays/units 120 to provide private, hand free communication management within certain space (region of interest). In this connection reference is made to FIG. 3 illustrating an end unit 200 configured for use in the audio communication system described above. The end unit generally includes a transducer array unit 100, three dimensional sensing module 110 and may include a microphone array unit 120. Additionally, the end unit 200 typically also include an input/output module 130 configured for providing input and output communication between the end unit and a control unit 500 connected thereto.

As indicated above, the transducer array unit 100 may typically include an array of transducer elements 105, each configured to emit ultra-sound signals. The transducer array unit 100 may typically also include a sound generating controller 108 configured to determine appropriate signal structure and phase relation between signals emitted from the different transducer elements 105. The transducer array unit 100 is configured and operable for generating local sound region at a desired location. To this end, the sound generating controller 108 is configured to drive the different transducer elements 105 of the array 100 to transmit selected ultra-sonic signals with selected phase difference between the transducer elements 105 to form a focused ultra-sonic beam to a selected location (point in space) determined in accordance with the phase differences between emitted signals. The ultra-sonic signal may be formed with two or more selected main frequencies with selected amplitude and phase structure. The two or more frequencies and the amplitude and phase structure thereof is selected to provide air borne nonlinear demodulation of the sound waves of the signal forming desired audible sound wave at a desired location.

Technically, the different base frequencies within the ultra-sonic beam demodulated due to pressure waves' interaction in nonlinear medium (e.g. air, gas filled volume, water). More specifically, when the signal contains acoustic waves with two (or more) difference frequencies $f_1$ and $f_2$, the nonlinear of the air demodulate the signal and produces frequencies that are integer multiplicities of $f_1$ and $f_2$, sum of $f_1+f_2$, and difference between $f_1$ and $f_2$. Using appropriately ultra-sonic frequencies provides that the difference between the frequencies is within the audible acoustic spectrum and include the desired audible acoustic signal.

The transmitted acoustic signals therefore are configured to generate local audible region (a region at which sound is heard privately) at a selected location, preferably at close vicinity the user's head. To this end, based on data from the user detection module 520, the sound processor utility 600 determines the location of the head of the selected user. Then, as described above, utilizing mapping data from the mapping module 510, the transducer selector 620 selects a selected transducer (possibly more than one transducer; e.g. 100a, 100b, 100c in FIG. 2, or combination thereof), to be operated to transmit sound directly or indirectly to the user's head/ears.

Then the selected transducer is operated in the manner described above for generating and transmitting a localized sound field carrying the desired sound data towards close vicinity of the user's head/ear(s).

Figure 4A:
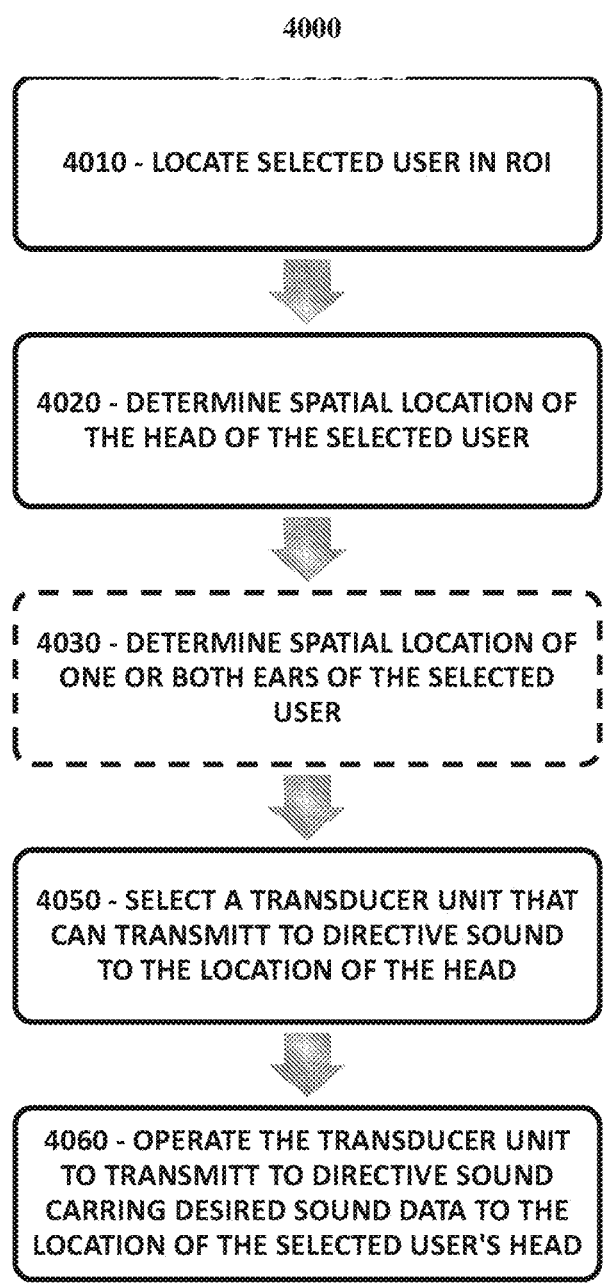
FIG. 4A is a flow chart showing a method carried out according to an embodiment of the present invention for transmitting localized (confined) sound field towards a user.
Figure 4B:
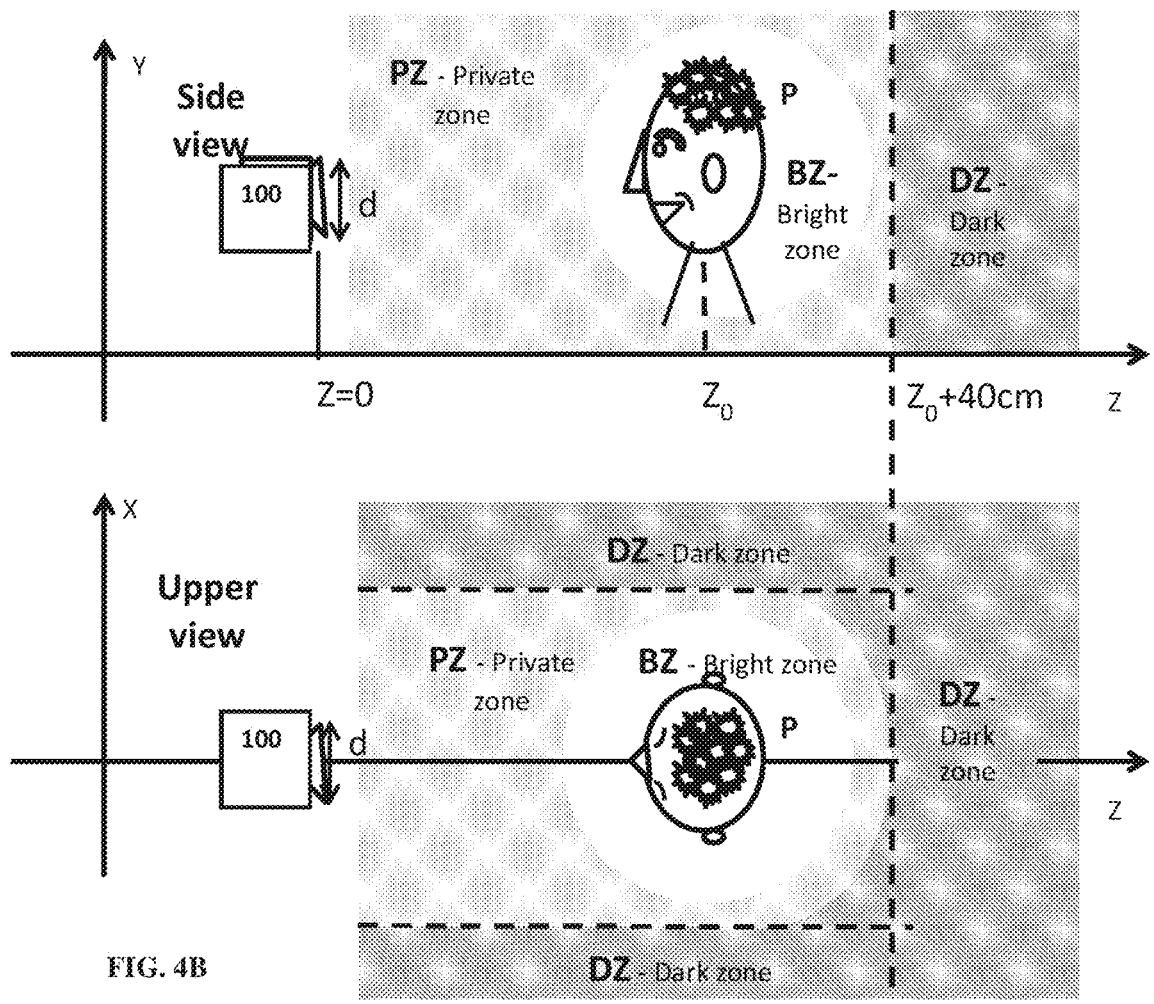
FIGS. 4B and 4C are schematic illustrations of a localized (confined) sound field generated in the vicinity of the user's head and ears respectively.

Reference is made now to FIGS. 4A and 4B, whereby FIG. 4A is a flow chart showing a method 4000 carried out according to an embodiments of the present invention for transmitting localized (confined) sound field towards the head of the user P, and FIG. 4B is a schematic illustration of the localized (confined sound field generated in the vicinity or the user's head). In operation 4010 the system, typically the user detection module 520 locate the users in the region of interest. In operation 4020 the face recognition module 530, identifies and locates the head of the user of interest (e.g. user P) within the region of interest. In operation 4050 the system. Typically, the transducer selector 620 determines/selects a suitable transducer unit 100 that can be used to transmit sound signals/field directly or indirectly towards the user's head so as to generate a localized confined sound field in the vicinity of (e.g. at least partially enclosing) the head of the user P. In operation 4060, the audio signal generator 630 is operated to generate operative sound encoding signals which can be used to operate the selected transducer 100 to transduce the localized/confined sound field in the vicinity of the user. To this end, in operation 4060 the sound from ultrasound (US) signal generator 632 is operated to determine the ultrasound content of the signals, which after non-linear interaction with the medium (e.g. the air) near the user, will generate/form an audible sound field that can be heard by the user. Also in operation 4060 the beam-former 634 is operated to generate the specific signals per each transducing element 105 of the selected transducer 100 such that the in accordance phase delays and the different spectral contend provided to each transducing element 105, one or more ultrasonic beams (typically two or more) of predetermined shape(s) and direction(s) will be transmitted by the selected transducer 100 towards the user, whereby the ultrasonic spectral contents of such beam is such that after interacting with the medium (e.g. air) in the vicinity of the user, they will create an audible sound field carrying the desired sound data to the user's ears. Accordingly, the transducer array unit 100 is operated to generate, using phase array beam forming techniques, an acoustic beam of ultra sound frequencies.

As shown in FIG. 4B, this technique effectively creates an acoustic bright zone BZ in which the transmitted signals form audible sound field that can be heard by the user. The acoustic bright zone BZ is typically selected to be near the user's head (e.g. surrounding all or part of the user's head). The bright zone BZ is surrounded from its sides and back by dark zones DZ in which the transmitted signal may still form some audible acoustic wave, but with sound pressure level (SPL) which is sufficiently low so as not to be heard, or hardly heard, by the human ears. Accordingly, the acoustic bright zone BZ actually defines a sound bubble region in which the audible acoustic field carrying desired sound data can be heard and out of which the acoustic field is not audible (e.g. as it is in the ultrasonic frequency band) and practically can't be heard. Indeed, in some implementation, there may also be generated a private zone PZ acoustic region which includes a certain region in between the bright zone and the transducer array unit 100 at which the ultrasonic acoustic waves form some level of audible sound. Typically, this private zone extends for a certain distance (e.g. in the range between few centimeters and few decimeters) from the user P towards the transducer 100. To this end it should be understood the zone behind the user (e.g. from the user to the direction away from the transducer 100) is a dark zone at which audible sound is not heard.

Additionally or alternatively, upon selection of the transducer unit 100 (e.g. any one of the transducers 100a to 100m) to be operated for transmitting the audio field to the user P, the transducer selector module 620 verifies that there are no other users in the propagation path of the audio field towards the specified user P (namely that there are no other users in the area between the selected transducer and the user P). In that case the audio level in the "dark zone" DZ between the selected transducer and the user is less importance, as long as its SPL is lower than the SPL in the bright zone BZ. Typically, indeed the SPL at this region is significantly lower than in the bright zone BZ. It should be noted that in case there are other users in the region between the selected transducer and the user P, then the transducer selector module 620 may select a different one of the transducers 100 for projecting the audio field to the user, and/or determines a reflective (indirect) propagation path for the audio field to the user (e.g. via reflections through OBJ).

Generally, it should be understood that when using the private audio technique of the present invention, the SPL outside the bright zone BZ (namely in the private and dark zones PZ and DZ surrounding the bright zone in any direction) is at least 20 db lower than the ZPL at the bright zone BZ.

FIG. 4B shows an example of generation of a confined sound field surrounding the user's head (e.g. the entire head of the user). However, in some implementations/embodiments of the system of the present invention, it is more preferable to generate a smaller sound bubbles (smaller localized audible sound fields) which are confined only at regions surrounding one or both of the user's ears, but not surrounding the entire head of the user P. This may have several advantages. For once, generating audible sound from ultrasound may generally not be highly energetically efficient. That is whereby large percentage of the energy is spent on generation of ultrasonic sound fields, only small percentage of the energy of the ultrasonic fields undergoes the non-linear interaction which converts them to audible sound. Therefore, in order to reduce the required power/energy for generating the desired audible sound field to the user, and accordingly possibly also reduce the complexity and cost of the transducers used, it is preferable to generate smaller localized audible sound field bubbles that are confined only near/about the user's ears. Additional advantage relates to the ability to provide the user with binaural (e.g. stereophonic) sound data which is generally possible when transmitting different sound content to the different ears. Yet additionally, generation of spatially extended confined sound bubbles (e.g. extending over several tens of centimeters so as to enclose the entire user head) with no/reduced distortions may in some cases be more complex (e.g. more computationally intensive and/or require larger number of transducer elements 105) than the generation of smaller sound bubbles (e.g. of only several centimeters to one or two decimeters) which are only confined about the user's ear(s). Therefore, for one or more of the above reasons it is in many cases preferable to generate smaller localized sound field only focused in the vicinity of the user's ear(s).

However, conventional face recognition and/or face features analysis techniques are generally incapable and/or are deficient in their ability to accurately, continuously and reliably identifying and determining the location of a user's ears. This may be due to several reasons: (i) the user ears may be hidden/partially behind/below his hair; (ii) the user may be viewed from its profile thereby hiding one of his ears; and/or (iii) some of the available techniques are also completely avoiding detecting of the users ears, possibly due to the complex 3D shape of the ear.

Figure 4C:
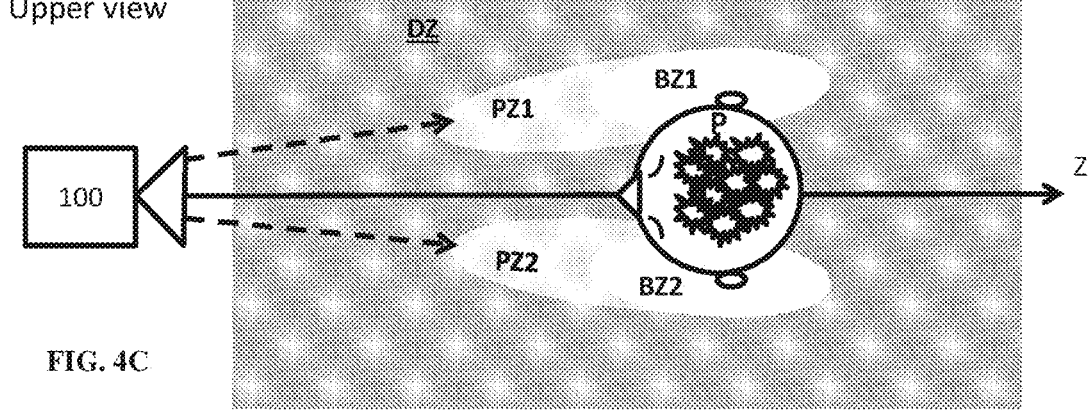

To this end, according some embodiments the method 4000 also includes operation 4030 which is carried out to determine the location of the ear(s) (one or both of the ears) of the user P so that a confined localized audible sound field, smaller than that required for the entire head, can be generated near one or both of the user's P ears. FIG. 4C is a schematic illustration showing in self-explanatory manner the smaller bright zones BZ1 and BZ2 of the confined audible sound (bubble), which are generated by the transducer 100 in the vicinity of the user's ears. As shown, outside these bright zones BZ1 and BZ2 there is dark zone at which audible sound cannot be practically heard. In some embodiments, optionally at a certain distance (e.g. of few decimeters) extending from the bright zones BZ1 and BZ2 to the transducer 100, there exists a so called private zones PZ1 and PZ2 at which audible sound can be heard but not clearly and/or with low intensity.

Figure 4D:
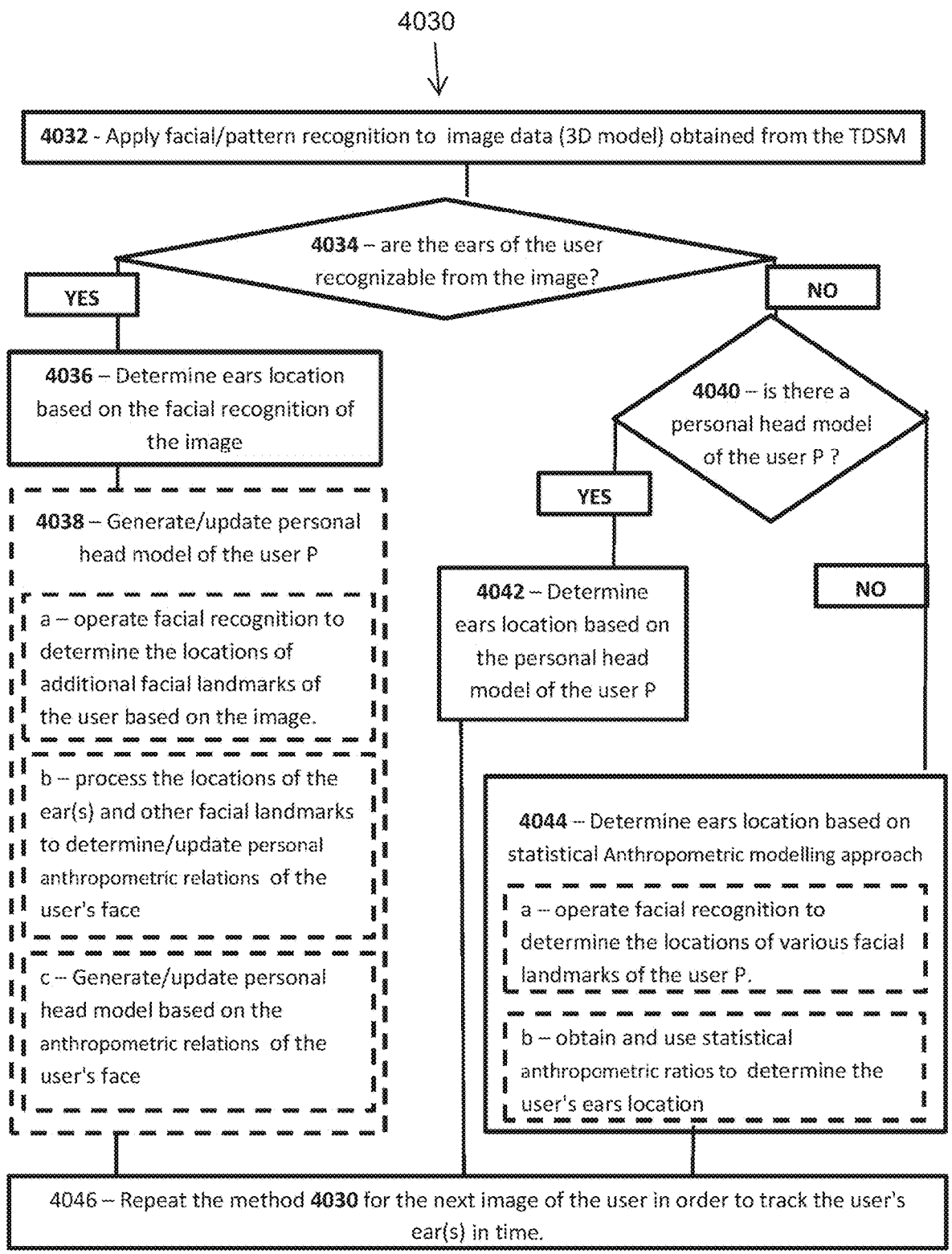
FIG. 4D is a flow chart of a method for determining the location of the user's ears according to an embodiment of the present invention.

FIG. 4D is a flow chart showing in more details the method for implementing operation 4030 of method 4000 for determining the location of the user's P ears. In some embodiments of the present invention the face recognition module 530 is configured and operable for carrying/implementing method 4030 to spatially locate and track the location(s) of the user's ear(s), while optionally by utilizing pattern recognition capabilities of the pattern recognition engine 515.

In operation 4032 the face recognition module 530 operates to apply facial/pattern recognition to the sensory data obtained from the TDSM (e.g. to the image data or the 3D model, and/or the composite image and/or the 3D image, obtained from the TDSM). To this end, facial recognition may be implemented according to any known in the art technique.

In operation 4034, the face recognition module 530 determines whether based on the facial recognition, the ears of the user P can be recognized in the image. In case the ears of the user P are recognizable in the image, the face recognition module 530 continues to operation 4036 where it determines ears location in the space covered by the TDSM based on their location in the image. More specifically, in this case based on 3D data from the TDSM' image/model, the face recognition module 530 determines the 3D position of the ear(s) in the sensing volume covered by the TDSM.

Optionally, in case the ears of the user P are recognizable in the image, the face recognition module 530 proceeds to carry out operation 4038 for generating/updating a personal head model of the user P. For instance, in operation 4038 the face recognition module 530 may determine/estimate the facial model of the user P based on the image by carrying out steps a, b and c as follows:

(a) Operate facial recognition scheme/process to determine the locations of additional facial landmarks (e.g. other than the ears) in the user's face. For example, determining the locations of the nose bridge and the eyes and the distances between them.

(b) Process the locations of the ear(s) and the locations of the additional facial landmarks in the user's P to obtain an estimate of certain personal anthropometric relations of the user's face. Accordingly, a personal head model including for example certain predetermined anthropometric relations of the user's face which associate the location of the user's ears to other facial landmarks is determined.

(c) Generate/update the personal head model based on the anthropometric relations of the user's face as obtained for the current image of the user's face. In this regards it should be noted that the face recognition module may include or be associated with facial data reference data-storage (not specifically shown) which is configured and operable for storing personal head models of users. The users for which facial models are stored may include be registered users (e.g. regular users which are known/registered in the system) and for which facial model data may be stored permanently. Optionally the facial reference data-storage also stores facial models of transient users (not registered in the system), for at least as long as such users are engaged with a communication session and/or as long as such users are within the spaces covered by the TDSMs of the system (e.g. the facial models for transient users may be deleted when the users leave the spaces covered by the system and/or when after their communication sessions terminate). Accordingly, before storing the personal head model determines in (b) the face recognition module 530 first checks to see if a matching model already exist in the facial reference data storage. If not the model is stored as a new model. However, if the matching model already exists, the existing model is updated based on the data obtained from the present image, namely based on the newly estimated model. In order to improve the accuracy of the stored personal head model of the user P during time, the updating may be performed while utilizing certain filtering schemes such as Kalman filter and/or proportional-integral-derivative (PID) filter, which allow the data obtained from plurality of measurements (e.g. from the plurality of images of the user) to be converged to form higher accuracy models.

It should be noted that operation 4038 is optional, and may be carried out in order to complete/update the head model based on the location of the ears and other facial landmarks in the image.

In case operation 4034 finds that the ears of the user P cannot be recognized in the image, the continues to operation 4040, where it determines whether the facial data reference data-storage of the face recognition module 530 already stores a personal head model of the user's P face.

In case the reference data-storage has a personal head model of the user P, the face recognition module 530 proceeds to carry out operation 4042 to determine the location of the ear(s) of the user P in the space, based on the personal head model of the user P and the location in the space of other facial landmarks identified in the image of the user obtained from the TDSM.

Otherwise, in case the reference data-storage does not include personal head model of the user P, the face recognition module 530 proceeds to carry out operation 4044 where it determines the location of the ear(s) of the user P in the space, based on a statistical anthropometric modelling approach. More specifically in this case the face recognition module 530 determines the locations of one or more facial landmarks of the user in the space monitored by the TDSMs (e.g. by processing the TDSM's image), and utilizes one or more statistically stable anthropometric relations between the location of the ears of users relative to the locations of other facial landmarks on order to obtain an estimate of the location of the user's P ears. To this end, in 4044, the detected facial landmarks in the image and corresponding anthropometric data is essentially used in 4044 to deduct the location of the ears.

Additionally, in 4044 the personal head model may be constructed or further updated based for example on the facial landmarks of eyes, nose etc., of the user. Accordingly, the head model is further updated as additional images of the user P are obtained and processed (see operation 4046). In this regard, even if in the ears are not visible in the image, the model may be updated by adjusting the locations of the facial landmarks of the model in accordance with the detected locations of the corresponding facial landmarks in the current image.

In this regard, the statistical anthropometric modelling approach implemented by the face recognition module 530 of the present invention may include one or more of the following:

(a) An average face proportions approach. This is a simplified approach based on the fact that a typical/average human face typically follow certain proportion relations such as those described for example in http://dhs.dearbornschools.org/wp-content/uploads/sites/625/2014/03/facial-proportions-worksheet.pdf. To this end, in some embodiments the face recognition module 530 utilizes the fact that the inter-pupillary-distance (IPD) is on average about $3/5$ of the head width. Accordingly, by applying facial recognition to determine the locations in the TDSM images of the facial landmarks corresponding to the user's pupils, the head dimensions and accordingly the ears positions can be estimated.

(b) Anthropometric modelling approach—This approach is based on available anthropometric statistical data obtained from measurements of plurality of users. To this end, in some embodiments the face recognition module 530 utilizes statistical anthropometric databases, such as available at https://www.facebase.org/facial_norms/ to derive empirical multi-variate functional relations between ears position of a user and various facial landmarks. This approach is sensitive to subtle relations in human subgroups and can account for instance for the combined effect of various parameters, such as wide nose with circular face etc. Accordingly, using the visible facial land marks in the image of the user P, the face recognition module 530 can determine their shape (e.g. wide nose) and accordingly classify the user to a certain subgroup of humans such as Asian, Caucasian or others, Then, based on the classified subgroup, the face recognition module 530 obtains the relevant accurate anthropometric relations for the user P.

Accordingly, as indicated in operation 4046, the face recognition module 530 repeats the method 4000 per each image obtained from the TDSM(s) which includes the user P. Accordingly, typically after one or more images are captured, typically the ears of the user are reveled and personal head model of the user P is constructed (e.g. from scratch even if such model was not apriority included in the facial reference database. More specifically, in many cases the ears are exposed and visible to the camera, especially when following the head movement over time, when the user naturally turns the head. Direct detection of ears position is thus available and the personal anthropometric relations between facial landmarks and ears position, for the specific user P can be determined accurately.

Thus, during the repeated analysis of images of the user's face, method 4000 provides for further updating such personal head model of the user to improve its accuracy. In other words, as more information and statistics is accumulated over time a more accurate and stable estimates personal head model of the user P is obtained. Accordingly, in some embodiments of the present invention method 4000 is implemented and used for locating and tracking the ears of the user of interest P. In turn the output sound generator module 600 generates the confined/private audible sound field near the user ears, and thereby efficiently transmits audible sound to the user P.

To this end, the acoustic signal forms a localized audible sound field defining a private zone confined to the vicinity of the region between the designated location $Z_0$ and the acoustic transducer system 10. The area includes one or more bright zone regions where clearly audible and comprehendible audible sound is produced. Outside of the bright zone BZ a dark zone region is defined in which the sound is either not audible to the human ear, or its content cannot be clearly comprehended.

Thus, turning back to FIG. 1A, it should be noted that according to some embodiments of the present invention the output sound generator module 600 is adapted to operate the one or more transducer units 100 to transduce acoustic signals to be received/heard by one or both ears of the user P, and possibly of additional users. More specifically, the user detection module 520 detects the ear(s) of the user P in the manner described above, and the transducer selector 620 determines/selects the transducer(s) 100 by which sound should be transmitted to each one of the ear(s). As indicated above, the transducer selector 620 determines the propagation path (direct or indirect path) of the acoustic signals from the selected transducer(s) to the respective ear(s) of the user P towards which the acoustic signals should be transmitted by the selected transducer(s). Accordingly the sound from ultra-sound signal generator 632 and the beam-former 634 are configured and operable to generate signals for operating the selected transducer array(s) to transduce ultrasonic acoustic signals which when undergo non-linear interaction with the medium (e.g. air) in their propagation path towards the user, form very small audible sound bubble(s) in the vicinity of (e.g. surrounding) one or both of the user's P ears. To this end, the size of the audible sound bubble of each ear may be as small as few millimeters in diameter and may be typically in the range of few millimeters to few centimeters, so as not to surround the entire head of the user P The technique above allows the system 1000 to provide individual audible sound to each one of the user's P ears separately. This, in turn permits to privately transmit binaural sound to the user P. To this end, it should be understood that the same of different transducer(s) 100 may be selected (by the transducer selector 620) and operated to transmit the sound to the different ears of the user P. For example, different transducers 100 may be selected in case the right ear of the user is in the line of sight of one transducer (e.g. 100a) and the left ear is in the line of sight of another transducer (e.g. 100b). Accordingly, also the distance between the transducer(s) 100 and the left and right ears of the user may be different (e.g. this may be due to the difference in distance between the transducer(s) and the ears and/or as a results of the user of reflective propagation paths to one or both of the ears). Therefore, in such embodiments, there may be a need to adjust the balance of the audible binaural sound provided to the user (namely properly adjust the balance between the right and left volumes of the audible sound bubbles the user hears). Indeed, transmission the sound to the left and right ears with the same intensity may yield unbalanced right-left audible sound to the user, due to the difference in the propagation paths between the respective transducer(s) and the right and left ears of the user P. Therefore, according to some embodiments, after the transducer selector 620 selects the respective one or more transducer(s) 100 that would be used to transmit sounds to the ears of the user P and after it determines their respective direct and/or indirect propagation paths to the respective ears, the transducer selector 620 further determines the attenuation levels of the transmitted acoustic signals/fields along the propagation paths to each ear of the user P. Accordingly, the transducer selector 620 provides the sound from ultrasound signal generator 632 with data indicative of the attenuation levels of the audible fields during their propagation to the user's ear(s). In turn the ultrasound signal generator 632 utilizes the received attenuation levels in order to adjust the transmission amplitudes of the ultrasound signals so as to obtain at least one of the following:

(1) maintain a predetermined a right-left balance (e.g. equalized balance and/or user-adjusted balance) between the volume of the audible sound heard by the right and left ears of the user P; and (2) provide the user with a timely continuous/smooth volume while the user may move through the space(s) covered by the system 1000 and while during this movement, different traducers may be switched to serving the user while being possibly at different distances from the user's ears.

Figure 5:
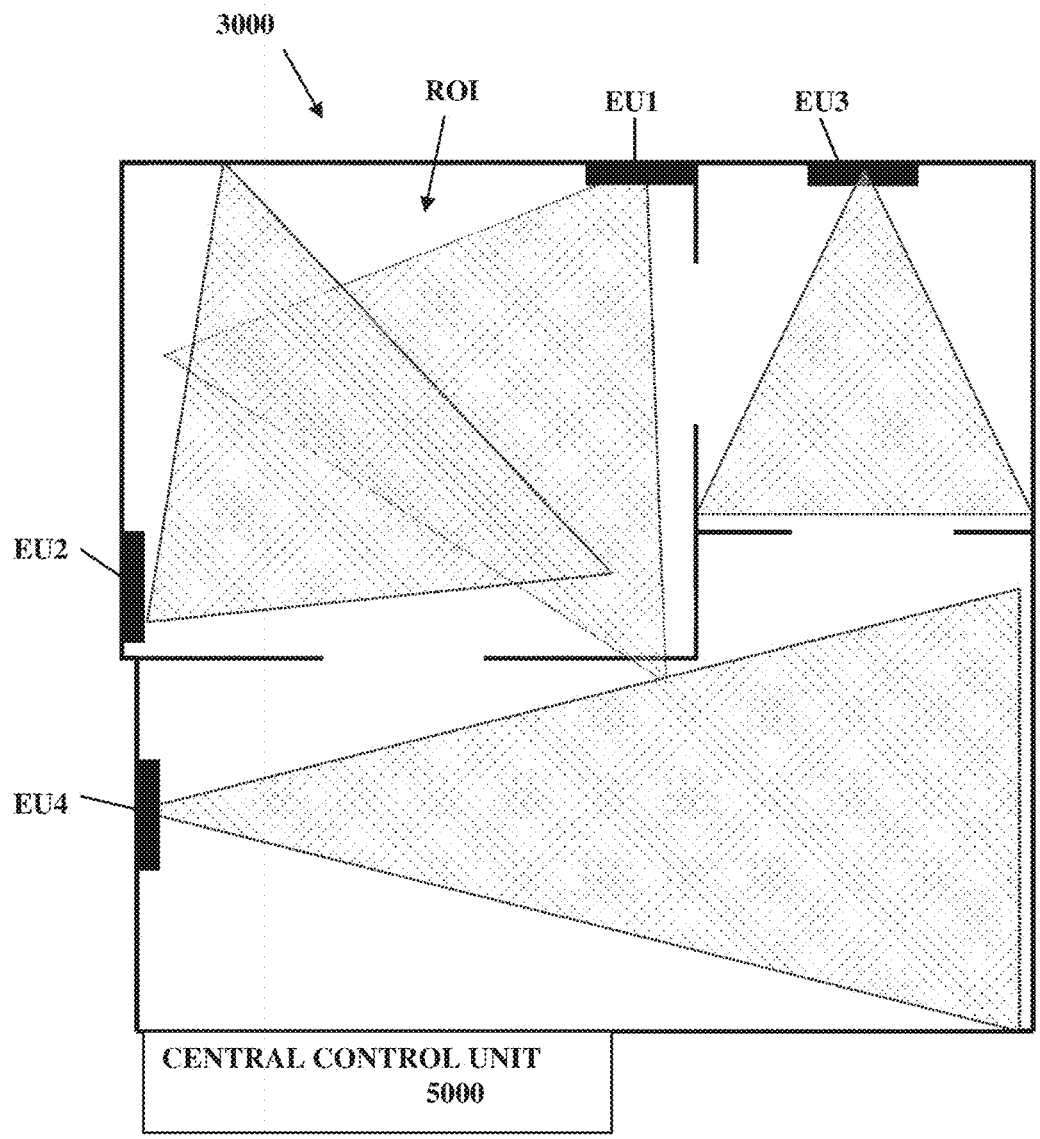
FIG. 5 exemplifies employment of an audio communication system according to some embodiments of the invention in a region of interest.

Reference is now made to FIG. 5 illustrating a system for audio communication 3000 according to some embodiments of the invention, employed in partially connected site with a space (region of interest ROI). In this example the ROI may be an apartment, office space or any other desired location. To provide coverage of the ROI, a plurality of end units (EU1, EU2, EU3 and EU4 in this example) are employed at selected location within the ROI. The end units generally include a transducer array unit 100, TDSM unit 110 and possibly microphone array 120, and are generally similar to the end unit 200 shown in FIG. 3 or to distributed management communication system 1000 exemplified in FIG. 1. The different end units (e.g. EU1) may be mounted on a wall, a ceiling, or any other surface, or be standing units, and configured to cover a corresponding coverage zone, which preferably aligns or mostly aligns with sensing volume of the TDSM unit of the end unit when used.

In this example, the audio communication system 3000 is configured as centrally controlled system and includes a control unit/audio server 5000. The audio server 5000 may include one or more of the above described modules, including mapping module, user detection module and sound processor utility. As indicated above, the control unit 5000 is configured to respond to request to initiate communication session (either unilateral or bilateral) and manage ongoing communication session providing private sound region to the one or more users communicating. As indicated above, a communication session may be unilateral (the system transmits selected sound to a user) or bilateral (the system also collects sound from the user for processing or transmitting corresponding data to another user/system).

Figure 6:
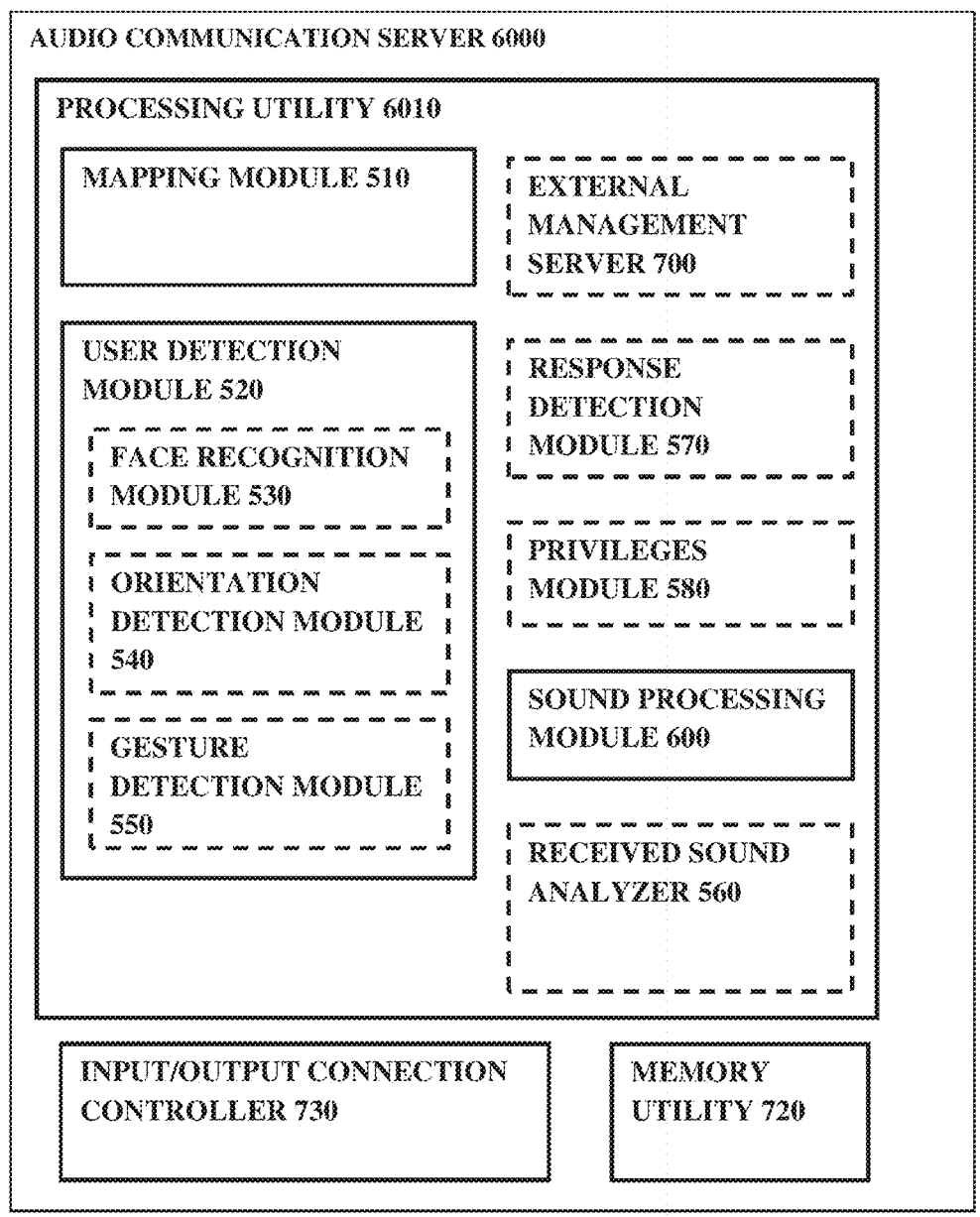
FIG. 6 schematically illustrates an audio communication server/control unit according to some embodiments of the present invention.

In this connection, reference is made to FIG. 6 illustrating schematically an audio communication server 6000 configured and operable for operating a plurality of one or more transducer array units in combination with sensing modules to provide private and hand free audio communication within a region of interest. The server 6000 may be used as central control unit (e.g. control unit 500a or 5000 in FIGS. 2 and 5) connectable to a plurality of distributed end units including transducer array units, TDSM units and microphone units; or it may be configured as an integral part of an audio communication system as exemplified in FIG. 1, in which the end unit 200 and the processing utility are packed in a single unit (single box). Generally, the audio communication server 6000 may be a standalone server configured for connecting to a plurality of end units 200 as described above with reference to FIG. 3. Alternatively, or additionally, in some embodiments, the audio communication server 6000 may be configured with one or more integral end units 200 while being connectable to one or more additional end units 200 as the case may be.

The audio server system 6000 generally includes one or more processing utilities 6010, memory utility 720 and input/output controller 730. It should however be noted that the server system 6000 may typically be configured as a computerized system and/or may include additional modules/units that are not specifically shown here. Also it should be noted that the internal arrangement of the units/modules/utilities of the server system may vary from the specific example described herein.

The input/output controller 730 is configured for connecting to a plurality of end units each including at least one of transducer array unit, TDSM unit and microphone array. Typically, some of the end units may be configured as described in FIG. 3 above providing a single physical unit including transducer array unit, TDSM and microphone array. Generally, the input/output controller 730 enables communication with one or more selected end units using generally known techniques of network communication.

The one or more processing utilities 6010 typically include a mapping module 510, user detection module 520, sound processing module 600 as described above, further the one or more processing utilities 6010 may also include an external management server 700, a response detection module 570 and a privileges module 580.

Generally, as indicated above, the mapping module 510 is configured for providing calibration data about arrangement of transducer units and TDSM units within the ROI. The calibration data may be pre-stored or automatically generated. In some embodiments, the mapping module 510 is configured and operable to receive sensory data from the plurality of TDSM units, and in some embodiments from the transducer array units and input data about system employment in the region of interest, and to process the data for generating a 3D mapping model of the region of interest. The 3D model typically includes structure of the ROI, coverage regions of the different transducer unit and TDSM units, and data indicative of relatively stationary objects in the ROI. In some configurations, the 3D model may also include data about acoustic reflection and absorption properties of different surfaces in the ROI as detected by the different transducer array units. The 3D model is typically stored in the memory utility 720 and may be updated periodically or in response to one or more predetermined triggers.

The user detection module 520 is configured and operable to receive input data about a user to be detected, and to receive input data from the TDSM units about users within the ROI to thereby locate the desired user and determine spatial coordinates thereof. In some embodiments, the user detection module 520 is configured to determine spatial coordinates associated with location of the user's ears. Additionally, or alternatively, the user detection module 520 is configured and operable to be responsive to commands provided by one or more users in the ROI and generate corresponding indication to the sound processing utility 600. Generally, as indicated above, the user detection module may include, or be associated with, one or more sub modules including face recognition module 530, orientation detection module 540 and gesture detection module 550.

As indicated above, the face recognition module 530 is configured and operable for receiving input sensory data indicative of one or more users, and preferably of faces of the users, and data about user identity that may be presorted in the memory utility, and for processing the sensory data to thereby determine identity of one or more users. To this end the face recognition module 530 may utilize one or more face recognition techniques as well as pre-stored data about one or more identities of registered users.

The orientation detection module 540 is configured to determine orientation of a detected user's head and location of the user's ears. To this end, the orientation detection module is configured and operable for receiving input sensory data and for processing the input data as indicated above using one or more image processing techniques as generally known in the art.

The gesture detection module 550 is configured and operable to be responsive to one or more movement and/or vocal gestures from one or more users in the ROI and for generating an appropriate notification including data about the requesting user and location thereof, and the requested command Generally, as indicated above, the gesture detection module 550 is configured to be responsive to a plurality of predetermined vocal or movement related gestures, the gestures are assigned with corresponding commands associated with one or more action to be performed by the system. For example, a user may request "call home" requesting that the system will operate to determine the user's identity, search for the user's home phone number, and utilize the external management server 700 to communication with the phone connection to initiate the call. Additional commands may be associated with control of operation of different external systems, such as "turn on TV" command associated with identifying the TV unit within the region where the user is located and turn it on, or with communication with other users. In some embodiments, the predetermine commands may include operation commands associated with system management such as request to increase volume, access data, etc.

The sound processing utility 600 is configured and operable to be connectable to the one or more transducer units and to operate one or more selected transducer units to generate selected acoustic signal and provide desired private sound to one or more selected users. Generally, the sound processing utility is configured for receiving or generating data about audio signal to be transmitted to one or more selected users, and to receive data about the user's location from the user detection module 520. The sound processing utility may also receive data about 3D model of the ROI from the mapping module 510 (or from the memory utility 720) and determine one or more selected transducer units suitable for transmitting the desired acoustic signal to the selected user(s).

The sound processing utility 600 may also be configured and operable for analyzing input and/or output audio data. For example, the sound processing utility 600 may be configured to receive data indicative of audio/vocal user instructions from the gesture detection module, to thereby analyze the input data with one or more speech (free speech) recognition technique and generate corresponding instructions.

In some configurations, the sound processing utility 600 may also be configure for using one or more cloud processing techniques. The sound processing utility 600 may thus be configured to transmit data indicative of audio signal to be processed to a remote processing utility through the external management server 700. The data is processed and analyzed by a remote server and corresponding analyzed data is transmitted back to the audio communication server 6000 and the sound processing utility 600 thereof.

Typically, the sound processing utility 600 may be configured and operable for processing input data and generate corresponding output data and to perform one or more of the following processing types: translation of input data from one language to one or more other languages, analyzing input data to determine one or more technical instructions therein, analyze input data to provide filtered audio data (e.g. filter out noise), process input data to vary one or more properties thereof (e.g. increase/decrease volume, speed, etc.) and other processing techniques as the case may be. The processing may be performed by the sound processing utility 600 and/or partially performed at a remote processing server as described above.

As indicated above the sound processing utility 600 may determine one or more possible line of sights between selected transducer array units and the user' ears. Typically, the sound processing unit may be configured to prefer transmission of acoustic signals along clear line of sight; however in some embodiment the sound processing utility may utilize a reflective type line of sight, in which the acoustic signals undergo one or more reflections from one or more surfaces before reaching the user's location. As also indicated above, the sound processing utility 600 is typically configured to operate one or more selected transducer array units for generating private sound region at selected location as described above and in patent publications WO 2014076707 and WO 2014147625 assigned to the assignee of the present application.

Additionally, according to some embodiments, the sound processing utility 600 may include, or be associated with, an audio input module 610. The audio input module may be connectable to one or more microphone array units employed in the ROI and to receive acoustic input data associated with user's generated sound. Such acoustic input data may be associated with vocal command related gestures as well as user response as a part of bilateral communication session. The audio input module 610 may be configured to receive input data associated with acoustic audible signals collected by the one or more microphone array units. Generally, the microphone array units may be configured to also provide data associated with location of source of the collected acoustic audible signals. This may be provided by proper selection of the microphone array unit, e.g. units configured as phase array of microphone elements or directional microphone elements. Additionally, in some configurations, the collected acoustic audible signals may be processed in accordance with ultra-sonic signals collected by one or more selected transducer arrays to determine correlation between ultra-sonic reflection from the user and audible input from the user and filter out noised from the periphery of the user. More specifically, the transducer array is operated to focus a single ultrasonic wave on the users face based on the user location provided by the user detection module 520 in accordance with sensory data from the corresponding TDSM units. The transducer unit may also collect data about reflection of the ultra-sonic signals reflected from the recipient's (user) face. Movements of the user's face, such as mouth movements, create small variations to the reflected waves due to Doppler Effect. These variations are generally correlated to audio signals generated by the user and may be processed in combination with input audio signals to filter out surrounding noise and improve signal to noise ratio.

As indicated above, the audio communication server 6000, and processing utility 6010 thereof, may also include response detection module 570 and/or privileges module 580. The response detection module 570 is generally configured and operable to determine data indicative of user's reaction to input signal transmitted thereto. More specifically, the response detection module 570 may be configured and operable to receive data about one or more signals transmitted to a user from the sound processing utility 600, and sensory data of the user from the user detection module 520 and/or one or more corresponding TDSM of end units, and to correlate the input data to determine user response to the signal. Generally, a user's response may be associated with movement pattern, change in facial expression, generating sound etc.

Such response data may be collected for further processing and analysis, or transmitted to external system, e.g. the system that initially generated the signal transmitted to the user, as indication of receipt. Such response data may be used for example, for parent to identify if their kids have responded to messages sent to them, for advertisement analysis and other uses.

The user privilege module 580 is configured for receiving data about one or more users generating one or more commands to the system, and data about the requested command and for determining of the requesting user has privileges right for initiating the command. As indicated above, the audio communication system may provide private sound to one or more different users. Additionally, vocal and movement gestures may vary between users, as well as access and management privileges. To this end the privilege module 580 may correlate data about user identity and requested action and determine, based on pre-stored privileges map, if the user has the right to initiate the requested action or not, or to specifically identify the requested action in accordance with identity of the requesting user. It should be noted that user identity may be determined in accordance with input sensory data associated with the user, or in accordance with vocal or gesture type password provided by the user. To this end the privilege module 580 may be configured and operable for receiving input data indicative of one or more keywords provided by the user and determine if user identity is sufficiently determined. Additionally, the privilege module 580 may be configured and operable for allowing or preventing access to external actions performed by the external management server 700 as the case may be.

The processing utility may also include an external management server 700 configured to mitigate communication between the audio communication server 6000 and external system as the case may be. For example, the external management server 700 may be connectable to a communication network, telephone line, different electronic systems such as home appliances, remote (cloud) server etc. The external management server 700 is configured to initiate actions such as providing notification to specific users, e.g. washing machine finished cycle, manage input calls from outside sources, as well as to transmit data from the system or the users in the ROI to any desired connected external system.

Figure 7:
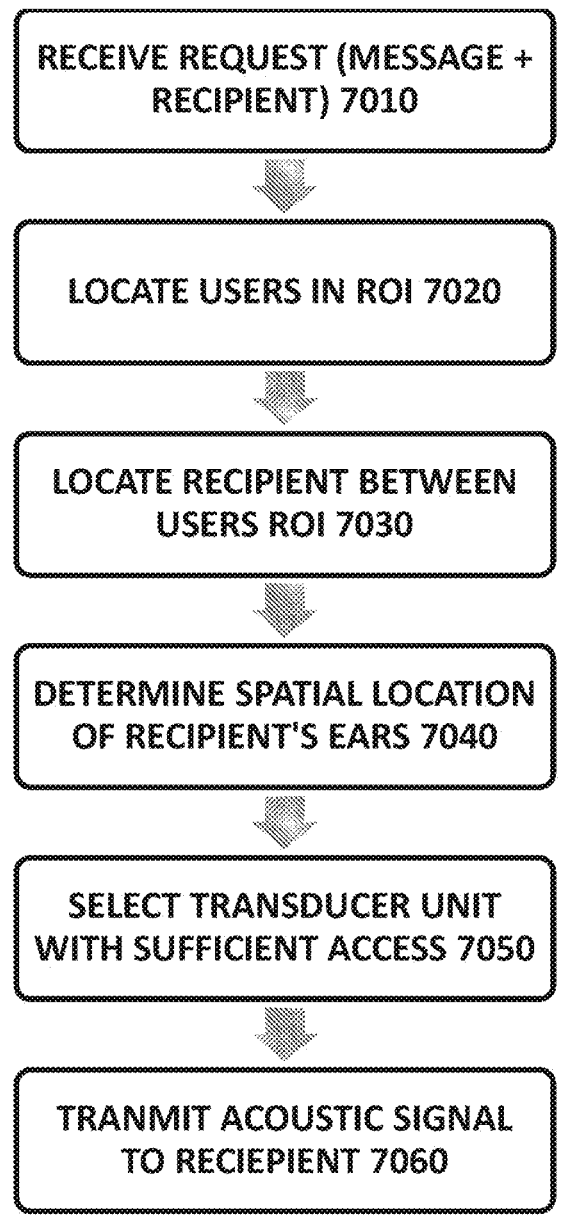
FIG. 7 exemplifies a method of operation for transmitting acoustic signals to a user according to some embodiments of the invention.

In this connection, reference is made to FIGS. 7, 8, 9 and 10, exemplifying methods of operation of the audio communication system according to the present invention for several exemplary actions. In FIG. 7 the system operates to transmit certain signal to a selected user; in FIG. 8 the system provides seamless communication session to moving user; in FIG. 9 the system response to user initiated action; and in FIG. 10 the system determines user's response to input signal.

As shown in FIG. 7, the system receives a request for transmitting message to a user 7010, either from a different user, the processing utility (e g management data signal) or from an external system through the external management server. The request typically includes data about one or more messages to be sent and data about a user/recipient to the message. Received requests may generally be pre-processed to determine one or more request properties such as urgency, request type etc. Further, the pre-processing may include verifying if outstanding user instructions exist regarding corresponding requests (e.g. user wishes to receive requests only at certain hours, user wishes to receive requests in bulks, or a number of requests within certain time period etc.). Once the request is allowed to be transmitted to the user, the communication system operated the user detection module to located users within the ROI 7020, and to identify the selected recipient between the users 7030. If the requested user in not found, a response notification may be sent to the source requesting the signal transmission, the system may select a default user or utilize connection to one or more speakers and play general audible message to all users. If the user is located, the user detection module identifies spatial coordinates of the user 7040 and the sound processing utility may determine preferred transducer array unit for transmitting the signal 7050. The sound processing utility can then transmit data indicative of the signal and the spatial location of the user to the selected transducer array unit for transmission of the signal to the user 7060. It should be noted that such a signal may initiate a bilateral communication session such as telephone conversation. Alternatively, such signal may be informative only and merely indicate user reaction to determine if the user actually received the signal or not.

Figure 8:
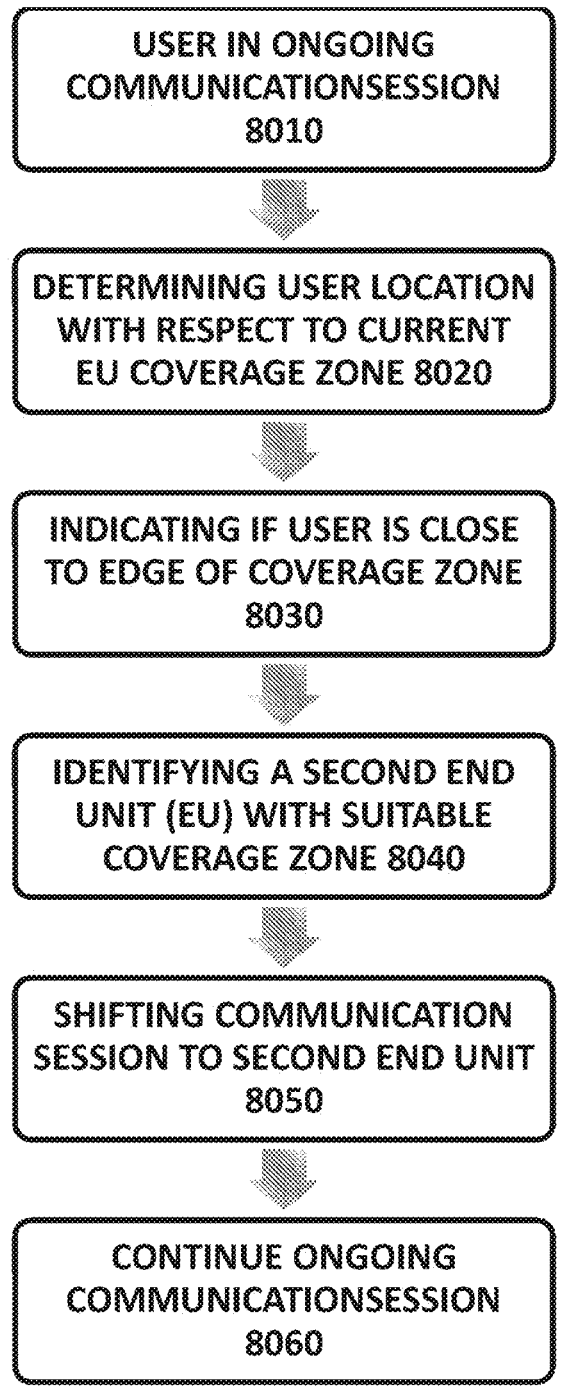
FIG. 8 exemplifies a method of operation for maintaining ongoing communication for moving user according to some embodiments of the invention.

FIG. 8 exemplifies a technique for providing seamless and hand free communication to users according to the present invention. As shown when a user is in ongoing communication session 8010 (e.g. telephone conversation with a third party, or listening to music) the system marks the user is active and follows user's location 8020. Additionally, the system collects audio signals generated by the user to be transmitted to the third party and therefore maintaining communication. The user detection module follows location data of the user 8020 and generated indication to the sound processing utility if the user is near an edge of coverage zone of the transducer unit used 8030. When the user is close to edge of the coverage zone, the sound processing utility determines and identifies an additional transducer array unit having coverage zone suitable to provide communication to the user's location 8040 and determines measure data indicative of suitability of transducer array unit to a specific location and orientation of the user. When the additional transducer array is preferred over the currently used one the sound processing utility shifts communication session to the newly selected transducer array 8050 to continue ongoing communication session 8060.

Figure 9:
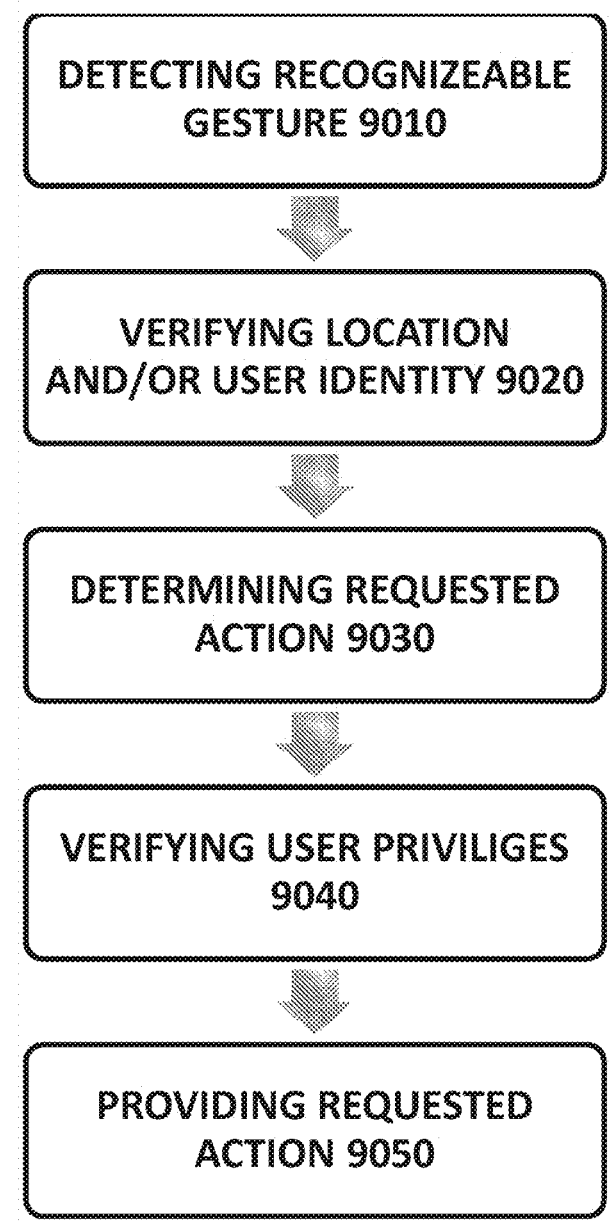
FIG. 9 exemplifies a method of operation for responding to user initiated requests according to some embodiments of the present invention.

Additionally, FIG. 9 exemplifies system operation in response to a user's initiated action. In this connection, the user detection module is generally actively receiving sensory data from the ROI for processing the sensory data and determining locations of users. The gesture detection module received data about user's movement or audible signals generated thereby and determines if a recognizable gesture is performed by a user 9010. When a gesture is recognized, the face detection module may be operable to determine user's identity 9020 and the gesture module determines the corresponding command associated with the gesture 9030. Generally, the user's identity is compared with the user privileges for the requested action 9040. If the user has not privileges, the system may provide him with appropriate notification. The requested action may be provided 9050 by transmitting requested data to a remote location through the external management server, or initiating communication session or any other action specified. As indicated above, an action may be a request to communication with specific other user, being within the ROI (internal private communication session) or remote (e.g. telephone call type communication session, or communication with remote ROI connected to the same or similar audio communication system). Additionally, or alternatively, such action may be associated with operation of third party systems such as turning on the water heater, opening front door, turning volume of audio system up or down etc.

Figure 10:
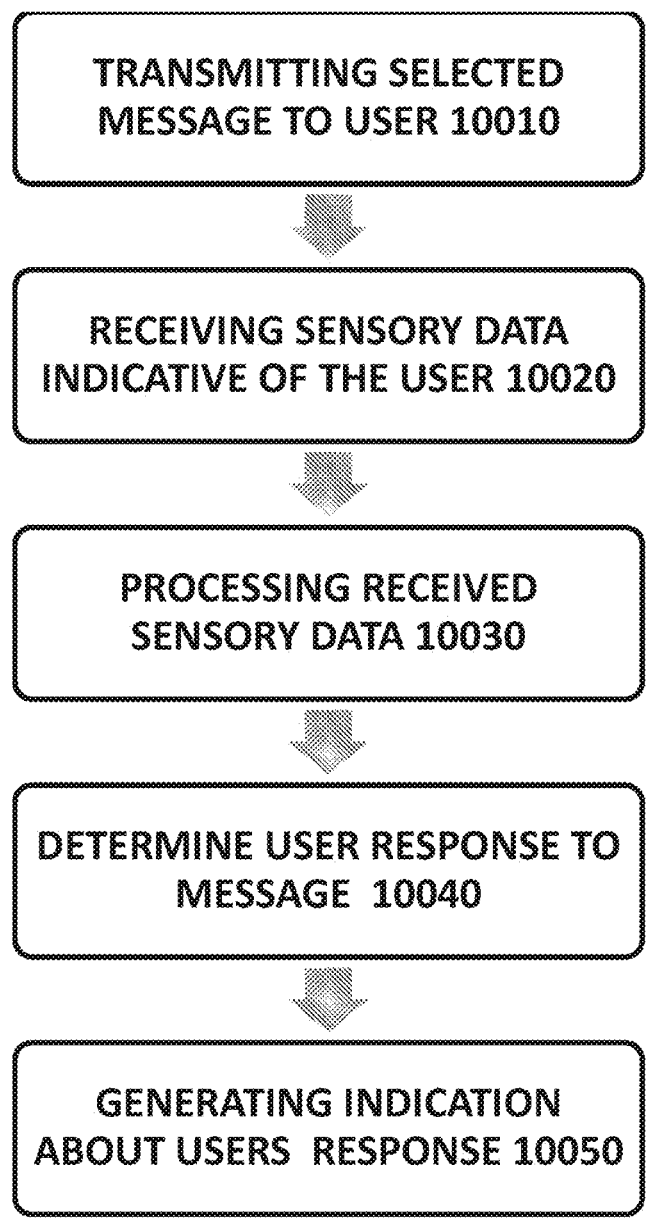
FIG. 10 exemplifies a method of operation for determining user response to transmitted acoustic signal according to some embodiments of the present invention.

FIG. 10 exemplifies operational technique for determining data about user response to input messages transmitted thereto. When an acoustic message is transmitted to a user 10010, the user detection module and the response detection module may be operated to receive input sensory data indicative of the user 10020. The received sensory data in processed 10030 in correlation with data about the transmitted signal to identify correlations between the user sensory data and the signal sent thereto. Such correlation may be associated with content of the transmitted signal however the correlation may also be temporal correlation. If the response detection module determined that the correlation is higher than a corresponding predetermined threshold, user response is determined 10040 and appropriate indication is generated 10050. The indication may be transmitted to the signal source as reading receipt, and/or stored for further processing locally or remotely.

Thus, the technique of the present invention provides unilateral and bilateral audio communication transmitted directly to selected user's ears while allowing only the selected user to hear the signals clearly. It should however be noted that the system and technique of the present invention as described herein may also be configured to selectively utilize one or more audible speakers for providing public sound within the ROI. This may be performed when a specific desired user is not found in the ROI, or in order to provide clear signal to a plurality of users. Additionally, the technique and the privilege module thereof may also be used to request users for proof of their identity such as request for a password or security question to determine user's identity.

Further, the technique and system of the invention as described above may be operable for providing various types of communication sessions based on the above described building blocks. Such communication sessions may be between a user and system control (e.g. the sound processing utility), between two or more user's communication through the system (located in different coverage zones (e.g. rooms)) within the ROI, or between one or more user and an external third party. Such external third party may be a remote user utilizing similar or different audio communication system (e.g. telephone conversation) or one or more other systems capable of receiving and/or transmitting appropriate commands.

Those skilled in the art will readily appreciate that various modifications and changes can be applied to the embodiments of the invention as hereinbefore described without departing from its scope defined in and by the appended claims.

The invention claimed is:

1. A method to spatially locate one or more ears of a user, comprising:
   obtaining, from one or more sensors, sensory data indicative of three dimensional model of a sensing volume;
   applying facial/pattern recognition to the sensory data, and utilizing the facial/pattern recognition to determine a spatial location of one or more ears of a user within said sensing volume; and
   in case the one or more ears of the user are not recognized by the facial/pattern recognition, deducing the spatial location of the ears based on an anthropometric model, by carrying out the following:
   (a) providing an anthropometric model indicative of one or more anthropometric relations between locations of the one or more ears relative to locations of other facial landmarks;
   (b) utilizing the facial/pattern recognition to detect the other facial landmarks of the user within said sensing volume; and
   (c) deducing the special location of the one or more ears, based on the detected other facial landmarks within said sensing volume and said anthropometric relations between locations of the ears relative to locations of other facial landmarks in the sensing volume.

2. The method of claim 1, wherein the step of deducing comprises deducing the spatial location of the one or more ears in case said one or more ears are hidden.

3. The method of claim 1, wherein said anthropometric model comprises a personal head model of the user stored in a facial data reference data-storage.

4. The method of claim 1, wherein said anthropometric model comprises a statistical anthropometric model comprising statistical anthropometric relations between the location of the ears of users relative to the locations of other facial landmarks.

5. The method of claim 1, comprising at least one of generating and updating a personal head model for the user.

6. The method of claim 5, wherein said at least one of generating and updating of the personal head model of the user comprises:
   (i) utilizing the facial/pattern recognition and determining locations of additional facial landmarks of the user other than the ears;
   (ii) processing the locations of at least one of the ears and the locations of the additional facial landmarks to obtain an estimate of personal anthropometric relations of the user;
   (iii) at least one of generating and updating of the personal head model of the user based on the estimate of the personal anthropometric relations of the user.

7. The method of claim 6, comprising further updating the personal head model by repeating operations (i) to (iii).

8. The method of claim 7, wherein said updating is performed utilizing a filtering scheme being at least one of a Kalman filter and proportional-integral-derivative (PID) filter.

9. The method of claim 1, wherein said sensors comprise one or more of the following:
   one or more cameras operating in the visual and/or infra-red (IR) wavebands;
   depth sensors comprising light detection and ranging (LIDARs) and/or structured light scanners;
   echo location sensors.

10. A system to spatially locate one or more ears of a user, comprising:
    one or more sensors configured and operable to measure sensory data indicative of three dimensional model of a sensing volume;
    a face recognizer configured and operable for applying facial/pattern recognition to the sensory data to determine the spatial location of one or more ears of a user within said sensing volume;
    wherein the system comprises facial data reference data-storage for storing at least one anthropometric model indicative of one or more anthropometric relations between locations of the ears relative to locations of other facial landmarks; and
    wherein the face recognizer is configured and operable to deduct the spatial location of the one or more ears of the user in case the one or more ears are not recognized by the facial/pattern recognition, by carrying out the following:
    (a) obtain, from said facial data reference data-storage, an anthropometric model indicative of one or more anthropometric relations between locations of the ears relative to locations of other facial landmarks;
    (b) utilize the facial/pattern recognition to detect the other facial landmarks of the user within said sensing volume; and
    (c) deduct the location of the ears, based on the detected other facial landmarks within said sensing volume and said anthropometric relations between locations of the ears relative to locations of other facial landmarks in the sensing volume.

11. The system of claim 10, wherein in case the reference data-storage stores a personal head model of the user, the face recognizer obtains the personal head model as said anthropometric model.

12. The system of claim 10, wherein in case the reference data-storage does not store a personal head model of the user, the face recognizer obtains, as said anthropometric model, a statistical anthropometric model comprising statistical anthropometric relations between the location of the ears of users relative to the locations of other facial landmarks.

13. The system of claim 10, wherein the face recognizer is configured for at least one of generating and updating a personal head model for the user in the reference data-storage.

14. The system of claim 13, wherein said at least one of generating and updating of the personal head model of the user comprises:
(i) utilizing the facial/pattern recognition and determining locations of additional facial landmarks of the user other than the ears;
(ii) processing the locations of at least one of the ears and the locations of the additional facial landmarks to obtain an estimate of personal anthropometric relations of the user;
(iii) at least one of generating and updating of the personal head model of the user based on the estimate of the personal anthropometric relations of the user.

15. The system of claim 14, comprising further updating the personal head model by repeating operations (i) to (iii).

16. The system of claim 15, comprising a filter, being at least one of a Kalman filter and proportional-integral-derivative (PID) filter, and wherein said updating is performed utilizing said filter.

17. The system of claim 10, wherein said sensors comprise one or more of the following:
one or more cameras operating in the visual and/or infra-red (IR) wavebands;
depth sensors comprising light detection and ranging (LIDARs) and/or structured light scanners;
echo location sensors.

18. An audio system, comprising:
one or more sensors configured and operable to measure sensory data indicative of three dimensional model of a sensing volume;
a user detector connectable to the one or more sensors for receiving said sensory data therefrom, and configured and operable to process said sensory data to determine spatial location of at least one user within the sensing volume;
the system according to claim 10 configured and operable for locating one or more ears of said at least one user;
at least one transducer unit; and
an output sound generator connectable to one or more transducers capable of directing sound field towards a selected spatial position within said sensing volume; said output sound generator is adapted to receive sound data indicative of sound to be transmitted to said at least one user, and operating said at least one transducer unit for generating and directing the sound field towards said one or more ears of the user.

19. The system of claim 18, wherein said output sound generator is configured and operable for determining two acoustic field propagation paths from said one or more transducers respectively towards two ears of the user, and operating said one or more transducer unit for generating and directing the sound field said two ears.

20. The system of claim 19, wherein said output sound generator is configured and operable for determining respective relative attenuations of acoustic field propagation along the two propagation paths to the two ears of the user, and equalizing volumes of the respective acoustic fields directed to the two ears of the user based on said relative attenuations.

* * * * *